United States Patent [19]
Goto et al.

[11] Patent Number: 5,839,872
[45] Date of Patent: Nov. 24, 1998

| [54] | APPARATUS FOR TRANSFERRING CARGOES |
|---|---|
| [75] | Inventors: Yukihiro Goto; Yoshihiko Yamada, both of Inuyama, Japan |
| [73] | Assignee: Daifuku Co., Ltd., Japan |
| [21] | Appl. No.: 320,440 |
| [22] | Filed: Oct. 7, 1994 |
| [30] | Foreign Application Priority Data |

Oct. 7, 1993 [JP] Japan .................................. 5-251894
Oct. 7, 1993 [JP] Japan .................................. 5-251895
Oct. 8, 1993 [JP] Japan .................................. 5-252642

[51] Int. Cl.⁶ ............................................. B65G 1/00
[52] U.S. Cl. ............................................ 414/280; 414/277
[58] Field of Search ................................. 414/277, 280, 414/282, 286, 661

[56] References Cited

U.S. PATENT DOCUMENTS

| 4,527,938 | 7/1985 | Leavitt, Jr. ............................. 414/280 |
| 4,856,956 | 8/1989 | Zur ......................................... 414/280 |
| 5,002,449 | 3/1991 | Kita et al. ............................. 414/280 X |
| 5,328,316 | 7/1994 | Hoffmann ............................. 414/661 X |

FOREIGN PATENT DOCUMENTS 3020-791  12/1981  Germany ............................... 414/280

*Primary Examiner*—Stephen T. Gordon
*Attorney, Agent, or Firm*—Schweitzer Cornman Gross & Bondell LLP

[57] ABSTRACT

A transporter movable perpendicularly to a transfer path along one or more shelving racks containing shelves, a cargo transfer apparatus is mounted from the transporter, and has a cargo platform for receiving cargo transferred therefrom and thereto along a horizontal transfer path between the platform and a shelf, a traverser disposed along at least one side of the transfer path and having a retracted position along said cargo platform and being extendable from its retracted position to and into the shelf, a first drive for reciprocating the traverser along the transfer path, a pair of transfer arms for pushing cargo toward and away from the cargo platform, and a second drive for moving the transfer arms between their resting positions and their active positions.

16 Claims, 15 Drawing Sheets

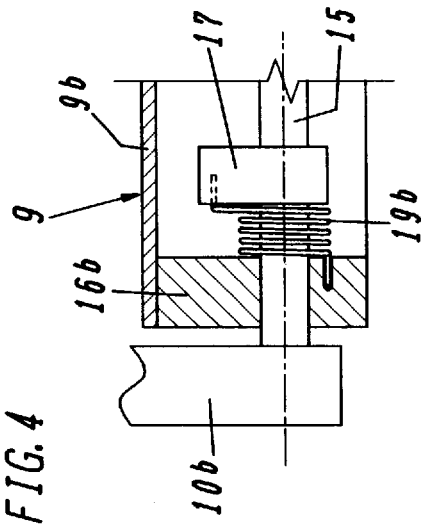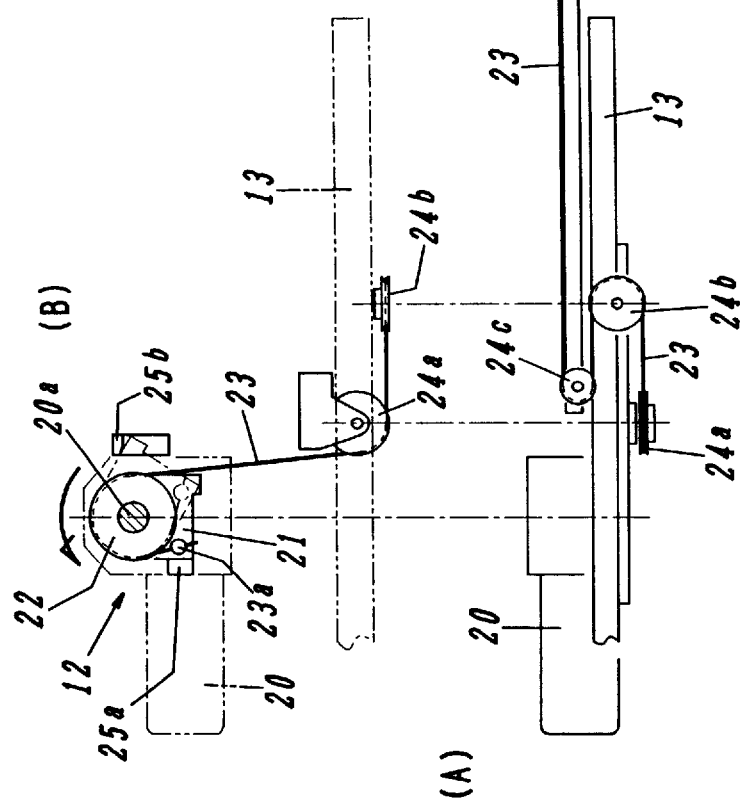

APPARATUS FOR TRANSFERRING CARGOES

FIELD OF THE INVENTION

The present invention relates to apparatus for automatically transferring cargo between a shelving rack or the like, to cargo transport apparatus, such as a truck, or a stacker crane driven on and along rails and carts the apparatus for cargo transfer.

BACKGROUND OF THE INVENTION

Cargo transfer apparatus of the type concerned, have a so-called running fork device which lifts up the cargo. These known devices also include the grasping conveyor type devices that grip the cargo at opposed sides and pull it from its resting position. Yet another type of known cargo transfer apparatus is of the hook-and-pull type that has a member that engages a hooked portion of the cargo and thus pulls it from its resting position.

In the running fork type devices there has to be provided a lower idle space for a running fork to move in under the cargo, and an upper idle space in which the cargo is contacted for lifting by the fork. A pair of pillows have to be laterally attached to a bottom plate of each shelf, and a prop supporting the pillows is required to be erected between two adjacent shelves, thereby noticeably reducing the useful space of the rack for storing cargo.

The grasping conveyor type and the hook-and-pull type cargo transfer apparatus are free from this problem. However, the grasping conveyor type apparatus which has two parallel conveyor units to grip the cargo cannot be used if the cargo is wider than a certain width. Many kinds of mechanisms are known for longitudinally displacing and retracting the conveyor units in cooperation with each other, for rotating them and for displacing them toward and away from each other. The resulting structure of such transfer apparatus is extremely complicated and requires a considerable investment in plant facilities. The hook-and-pull type devices are of limited utility, because it requires that the cargo have a corresponding hook.

SUMMARY OF THE INVENTION

An object of the present invention is to provide improved apparatus for transfer of cargo eliminating the drawbacks of prior art apparatus. The cargo transfer apparatus of the present invention improves the storage capacity of shelving racks containing a plurality of shelves without the cargo requiring any hooks and cargo of significantly varying width can be reliably handled and transferred by the less costly apparatus of the invention.

The cargo transfer apparatus of the present invention has a rigid cargo platform for receiving cargo transferred to it through a horizontal transfer path extending transversely between the cargo platform and an adjacent shelf, a traverser disposed along at least one of the opposite ends of the transfer path, a first drive for reciprocating the traverser along the transfer path, a pair of transfer arms for pushing the cargo toward and away from the platform, the transfer arms being respectively secured to a forward end and a rearward end of the traverser so that the transfer arms are arranged along the transfer path, and a second drive for operating the transfer arms, wherein the first drive moves the traverser between its retracted position beside the cargo platform and its extended position in and next to the shelf, and the second drive moves the transfer arms in opposite directions between their upright resting positions and their lowered active positions located in the transfer path.

The cargo is transferred from the shelf to the platform by retracting one of the transfer arms facing the shelf to its upright resting position when the empty traverser is moved in the shelf. Subsequently one transfer arm is lowered before the traverser is retracted to next to the platform. The lowered transfer arm thus pushes and moves the cargo onto the platform.

The cargo can be delivered from the platform to a different shelf, by lowering the other transfer arm that is remote from the shelf and behind the cargo when the traverser supporting the cargo is moved into the shelf. In that movement of the traverser, the other transfer arm is lowered in its active position as it pushes and moves the cargo into the shelf.

The cargo transfer apparatus of the present invention raises the storage efficiency of the shelving racks, even when individual laterally adjacent shelves contain goods. This is because the thin traverser and the upright transfer arm can reciprocate through a narrow gap left between the adjacent goods on the shelf. The transfer arm placed behind the cargo to push it toward the shelf or toward the cargo platform can operate smoothly, even if the width of the goods varies substantially. Due to the simple structure of the present invention compared to prior art grasping conveyors, the present invention can be manufactured at a considerably lowered cost. Any goods, even if they do not have a lifting hook, can be pushed into the shelf or onto the platform by the transfer arm placed in its active position.

It will be apparent that the cargo transfer apparatus of the present invention is adapted to be incorporated in a transporter that is movable along the shelving racks. The cargo is transferred transversely of the row of shelves in each rack, and a narrow gap provided between adjacent shelves is sufficient for the traverser and the transfer arms to push the cargo. Suitably a partition can be provided to insure that a gap is left between adjacent shelves.

The transfer arms pivoted to the ends of the traverser are spaced one from another along the transfer path. They can be controlled so that one arm stands upright when the other is lowered. They can alternatively be controlled to stand upright or be lowered together so that they can seize the cargo at opposite ends. In this alternative case the cargo being transferred is held firmly and will not rock, take any irregular position, or move away from the pushing transfer arm. The reciprocation of the traverser carrying the transfer arms can be speeded up to improve the efficiency of the cargo transfer.

A single traverser can also be used with the transfer arms arranged before and after it for pushing the cargo located on one side of the transfer path. Alternatively, two traversers can be employed located on both sides of the transfer path for moving cargo. In the latter case the cargo can be of a greatly varying width between the traverser. Left and right transfer arms can be lowered simultaneously to take their active positions, thereby to cooperate with each other to act on adjacent portions at the same level of the cargo to insure a smooth transfer.

In some cases, such as when the available funds are restricted, the apparatus need not be equipped with two traversers with each having a pair of transfer arms. In such cases, a lateral guide can be substituted for one traverser to reciprocate together with it. Cargo of almost identical width can be maintained in a stable position during transfer, since the lateral guide cooperates with the traverser to press against the cargo to prevent it from rocking.

The transfer arms pushing the cargo out of or into the shelf are swingable through an angle or 90°, between their upright resting positions and their lowered active positions. If the traverser carrying the transfer arms would be disposed too high on the apparatus, then the lowered arm would interfere with the cargo at a location that is too high above the bottom of the cargo, i.e. above the surface of the platform. Often the cargo handled in such apparatus involves plastic containers the higher wall portions of which are weaker than their lower wall portions. Thus, when relatively heavy goods are packed in the container, their higher wall portions are likely to be deformed or damaged by the pushing arms.

On the other hand, a position of the drive for moving the traverser will make it difficult locating the traverser sufficiently near to the surface of the rigid bed. The width of the transfer arms can be increased that they contact the bottom portion of each cargo, when lowered to their active position. Such broader transfer arms will necessitate a greater gap for allowing the traverser with the raised arm to make free strokes between the adjacent shelves, thus impairing the space efficiency of the rack.

The second driving means for swinging the transfer arms can be modified to resolve this problem to swing an angle of more than 90°. In this modification, each arm for pushing the cargo takes its active lowered position not horizontally but somewhat slanted downwardly. An end portion of the obliquely lowered arm is thus sufficiently lower than the traverser, even if the latter is employed relatively higher due to the presence of the drive. Thus, the traverser can be more easily and more naturally arranged, and the transfer arms can contact the side of the cargo at the lowest possible point thereby protecting that side from any deformation or other damage. The thin transfer arms when raised upright to advance through the narrow gap will not bulge outwardly of the traverser, thus providing a more efficient use of the space within the shelving rack.

A single mechanism can be employed to shift the position of each transfer arm from its upright resting position to its lowered active position, or back to the resting position. Such a mechanism, however, can cause a problem if it fails to raise the arm from its lowered position, fails otherwise to function and the upright arm will be lowered under its weight. Such an unintentionally lowered arm can collapse the cargo, or even push it out of the shelf into which it was just loaded.

The apparatus of the present invention can include an appropriate feature to avoid such an accidental result. Accordingly a spring is provided for urging the transfer arms toward their upright position. The second drive for driving the arms will in this case have to lower them against the bias of the spring which tends to keep them upright in the case of any problem with the second drive. Thus, the spring helps the arms raise themselves, and prevent them from becoming accidentally lowered when the drive is damaged.

The transfer arms are maintained in an upright position unless the drive lowers them. The arms will not become unintentionally lowered to damage the cargo, and will not erroneously move the cargo immediately after its having been loaded into the shelf. When the drive raises the arm it is not resisted by the spring. Thus, it can be of a simple structure, can be more inexpensively built than a hypothetical drive which is always resisted by a spring against it raising and lowering of the arms.

The second drive for the transfer arms is suitably an electric motor or other rotary actuator installed in the traverser for directly raising and lowering the arms. More suitably the drive contains a wire rope, a rotatable shaft with the transfer arms attached to it for pivoting motion, a rope end retainer secured to the rotatable shaft and holding one end of the wire rope, a driving rotor pivoted in and attached to the cargo platform to hold the other end of the wire rope, the wire rope is spanned through guide rings between the rope end retainer and the driving rotor, the guide rings being so arranged such that the entire path of the wire rope remains unchanged over its length in spite of the reciprocation of the traverser.

In the suitable structure just described, the torque of the driving rotor is transmitted to the rotatable shaft in opposite directions through the wire rope, the path of which is variable in a three-dimensional configuration due to the guide rings. The traverser need not be provided with any crossing transmission devices such as bevel gears which would be used in a chain and sprocket system. A lesser number of parts suffices to construct the second drive and permit it to be simpler in structure and more effective to render the traverser carrying the transfer arms more compact and lighter. This feature is advantageous in that the transverse width of the traverser and a power for driving it are reduced also to lower the construction cost of the apparatus. The traverser can traverse through a narrower empty space between the adjacent shelves, thus improving the space efficiency of the shelving rack.

DESCRIPTION OF THE DRAWING

Many other advantages and features of the present invention will become apparent from the following embodiments with reference being had to the drawing, wherein

FIG. 3A is a side elevational view of the apparatus, partly shown in vertical cross section;

FIG. 3B is a plan view of the principal parts in apparatus;

FIG. 4 is partial enlarged projection of FIG. 3A;

DETAILED DESCRIPTION

Figure 1:
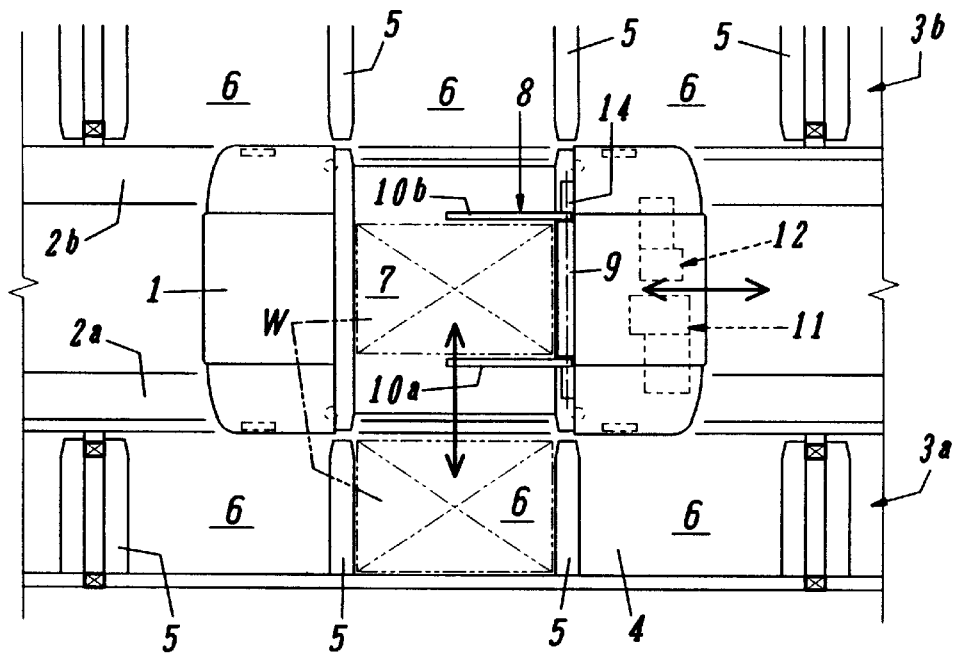
FIG. 1 is a plan view of a first embodiment of the cargo transfer apparatus of the present invention, with the apparatus being installed in a transporter and cooperating with shelving racks which are shown in part.

In a first embodiment of the present invention, as shown in FIG. 1 a transporter or electric car 1 is driven horizontally on and along a pair of parallel rails 2a and 2b. The rails provide a passageway for the car 1, between opposed shelving racks 3a and 3b. Shelves 6 are formed each between adjacent partitions 5 erected on a horizontal shelf bottom 4 for supporting cargo. The transporter 1 has a rigid cargo platform 7 flush with the bottoms 4 of the shelves 6, and is equipped with a cargo transfer apparatus 8 for moving the cargo "W" from the cargo platform 7 into the shelf 6, or out of the shelf onto the cargo platform.

The cargo transfer apparatus 8 includes a traverser 9, a pair of transfer arms 10a and 10b, a first drive 11 for reciprocating the traverser 9, and a second drive 12 for raising and lowering the transfer arms. The traverser 9 is extended and retracted along a side of the cargo platform 7 on the transporter 1. The path of that reciprocation of the traverser 9 along a cargo transfer direction for transferring cargo between the shelf 6 and the cargo platform 7 is perpendicular to the direction of travel of the transporter 1. The transfer arms 10a and 10b are respectively pivoted from the traverser's two ends spaced from each other in the direction of the reciprocation.

Figure 2:
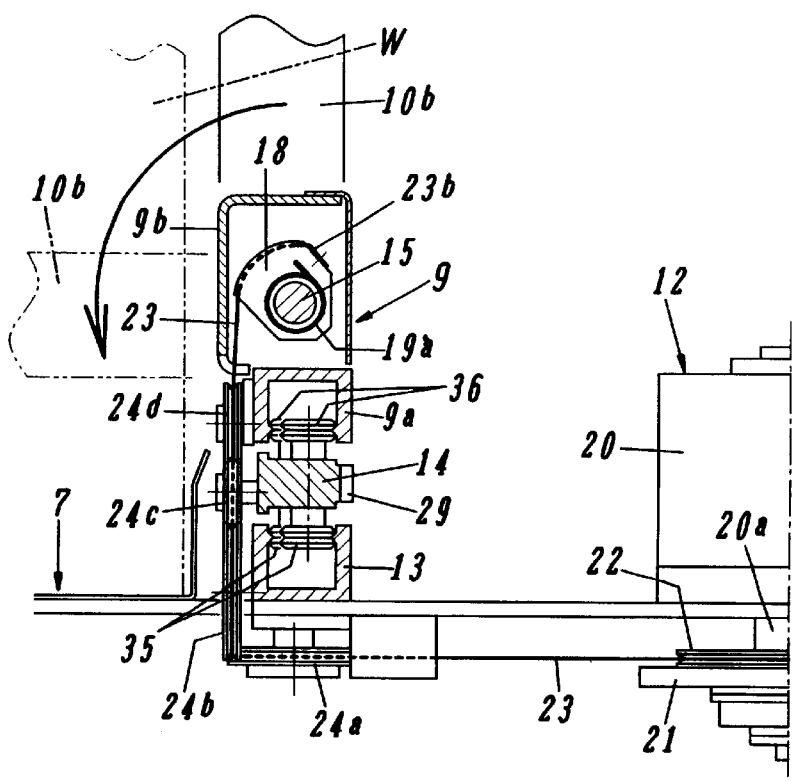
FIG. 2 is a vertical cross sectional view of principal parts of the apparatus.

As shown in FIGS. 2 and 3, the traverser 9 has a base 9a and a cover 9b is displaceably supported on a movable intermediate rail 14 of the cargo transport apparatus 8. This rail 14 in turn is displaceably supported on a fixed rail 13 in the cargo transfer direction, to extend and retract the traverser 9 in that direction. The traverser departs from its home position located beside the cargo platform 7 on the transporter 1 and approaches its extended position located in and at a shelf 6 when the traverser 9 and the intermediate rail 14 move outwardly relative to the intermediate and fixed rails 13, 14. The transfer arms 10a and 10b are adapted to pivot about a rotatable shaft 15 on the traverser 9. The shaft 15 is disposed in the direction of reciprocation of the traverser 9. The shaft 15 is journaled in bearings 16a and 16b at the opposite ends of the traverser.

A spring retainer 17 and a rope end and spring retainer 18 are secured to respective ends of the shaft 15, as shown in FIGS. 3A and 4. Coiled torsion springs 19a and 19b loosely fit on the respective ends of the shaft 15 located respectively between the retainer 17 and the bearing 16b, and between the other retainer 18 and the other bearing 16a. Each of the coiled torsion springs 19a and 19b has an end attached respectively to the bearing 16a and 16b, and another end attached respectively to the retainer 17 or 18. Thus, the springs always urge the transfer arms 10a and 10b toward their upright resting positions. The second drive 12 has a drive rotor 21 fixed to a vertical output shaft 20a extending from a reducer attached to an electric motor 20. The drive 12 further comprises a pulley 22 coaxially attached to the output shaft 20a, with the drive rotor 21 fixed on the pulley, so that a wire rope 23 is guided around the pulley 22 when wound up or being unwound. The wire rope 23 has an end 23a fixed to the drive rotor 21, and another end 23b (see FIG. 2) fixed to a peripheral portion of the rope end retainer 18. The second driving means 12 still further comprises first through fourth guide rings 24a–24d over which the wire rope 23 is spanned between the rope end retainer 18 and the drive rotor 21.

The wire rope 23 having one end 23a anchored to the drive rotor 21 turns around and extends beyond the pulley 22 to the first guide ring 24a. This ring is rotatably supported by a vertical shaft, which is located in the middle between the ends of the fixed rail 13. The first guide ring 24a deflects the wire rope 23 from its initial path to a succeeding path which runs parallel with the fixed rail 13. The wire rope then advances to the second guide ring 24b rotatably supported on a horizontal shaft attached to a side wall of the fixed rail 13. The second guide ring 24b guides the wire rope at a 180° angle change of direction to its return path, and the third guide ring 24C deflects the rope again by another 180° angle change of direction from the return path toward its forward elongate path running in parallel with the intermediate movable rail 14. The third guide ring 24c is also rotatably supported on another horizontal shaft attached to a rearward end of the movable rail 14. The path of the wire rope 23 continues to the fourth guide ring 24d which is rotatably supported on yet another horizontal shaft. This shaft for the fourth guide ring 24d is attached to the base 9a on a forward end of the traverser 9. That forward end is located most remotely from the third guide ring 24c. The fourth guide ring 24d deflects the wire rope 23 upwardly from its elongate path, so that the forward end of rope is finally turned at an angle around the retainer 18 and is attached to peripheral portion thereof. As best shown in FIG. 2, the angular direction in which the end of the wire rope 23 is turned around the retainer 18 is such that the downward pulling of the wire rope rotates the shaft 15 in a direction to lower the transfer arms 10a and 10b from their upright resting positions against the bias of the torsion springs 19a and 19b.

The arrangement of the shafts rotatably supporting the guide rings 24a–24d is such that the wire rope 23 always assumes a substantially S-shape as shown in FIG. 3A. Two curves in this S-shape are defined by the second and third guide rings 24b and 24c, in whichever direction the traverser 9 moves accompanied by the intermediate rail 14 (to the right or to the left in FIG. 3a). Tensioning of wire rope 23 can be adjusted by adjusting the position of the first guide ring 24a. The driving rotor 21 can be driven forward and backward between the angle defined between stoppers 25a and 25b. One stopper 25b will bear against the rotor 21 as shown in a broken line in FIG. 3b, to delimit its winding motion in a forward direction shown with an arrow. The stopper 25b can be displaced about the shaft 20a so that the angle between each of the lowered transfer arms 10a and 10b the horizontal plane is adjustable. Alternatively, an additional stopper (not shown) can be employed for this purpose. Such an additional stopper can be attached to the spring retainer 17, the rope end retainer 18, or a lug attached to the rotatable shaft 15 in the traverser 9.

Figure 5:
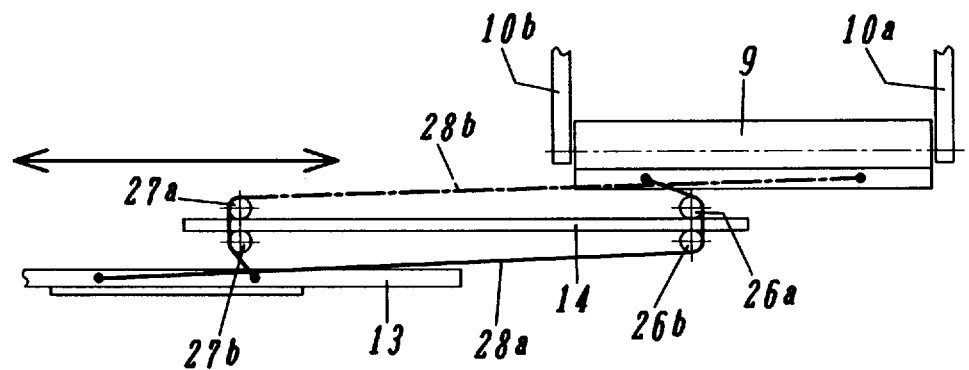
FIG. 5 is a schematic side elevational view of a first drive for moving a traverser in the apparatus.
Figure 6:
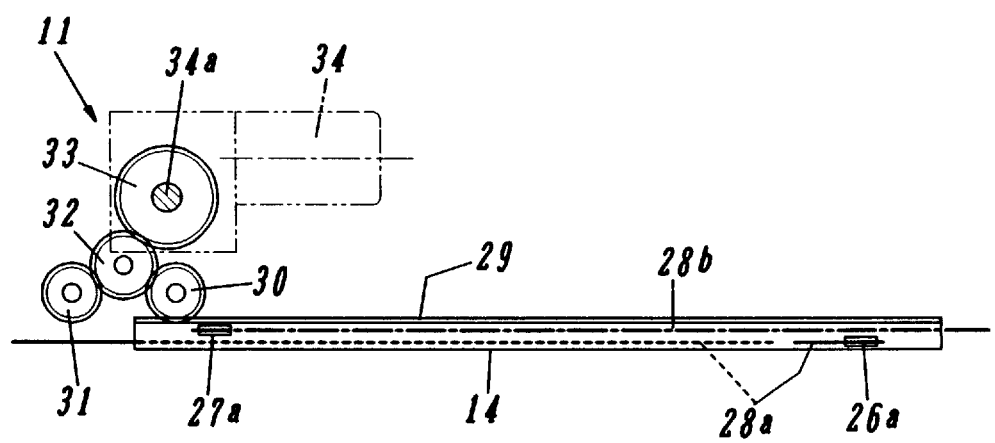
FIG. 6 is a plan view of a mechanism employed in the first drive to drive an intermediate movable rail.

An embodiment of the first drive 11 for driving the traverser 9 to move forward and backward is shown in FIGS. 5 and 6. Upper and lower sprockets 26a and 26b are rotatably supported at a forward end of the intermediate movable rail 14. Another pair of rotatably supported sprockets 27a and 27b are also disposed on top and below at a rearward end of the movable rail 14. One end of each of the two drive chains 28a and 28b is attached to the fixed rail 13, and their other ends are attached to the traverser 9. An intermediate portion of one chain 28a turns around one pair of the sprockets 26a and 26b, and an intermediate portion of the other chain 28b similarly turns around the other pair of sprockets 27a and 27b. A toothed rack 29 extends along a side of the movable intermediate rail 14. The first drive 11 also has a pair of pinions 30 and 31 of the same diameter and engageable with the toothed rack 29; an idler gear 32 always engaged with both the pinions; and a drive gear 33 engaging the idle gear and fixed from a drive shaft 34a. This shaft extends from a reduction box of an electric motor 34.

With the motor 34 being turned on to rotate the drive gear 33, the pinions 30 and 31 are driven to rotate in the same direction. Those pinions engaging the toothed rack 29 in the intermediate movable rail 14 move this rail forward or backward, or to the right or to the left as shown in the drawings. As shown in FIG. 5, if the traverser 9 has to move to the right or forward, the forward sprockets 26a and 26b engaged with one or the chains 28a pull a middle portion of the traverser forward so that the traverser 9 advances in the same direction as the intermediate rail 14. The other chain 28b pulls the traverser 9 to the left or backward when the intermediate rail 14 is retracted, thereby retracting the traverser also in the same direction as the rail.

This first drive 11 for the traverser 9 essentially has the structure known as "transferring running forks." Therefore, it is not described in further detail, except for the following. Only one of the pinions 30 located in front of the other pinion 31 remains engaged with the toothed rack 29 when the intermediate rail 14 advanced to its foremost position. As shown in FIG. 2, a plurality of circumferentially grooved rollers 35 are rotatably supported on vertical shafts depending at longitudinal intervals from the intermediate rail 14. Longitudinal lugs each protruding inwardly from opposite inner wall surfaces of the fixed rail 13 fit in a respective grooved roller 35, whereby the intermediate rail 14 can move parallel with and relative to and supported by the fixed rail 13. A plurality of other circumferentially grooved 36 rollers are rotatably supported on other vertical shafts protruding upwardly at longitudinal intervals from the intermediate rail 14. Other longitudinal lugs each protruding inwardly from opposite inner wall surfaces of base 9a of the traverser 9 fit into the respective grooved rollers 36, thereby allowing the traverser 9 to be moved parallel with and relative to the intermediate rail 14.

In operation to unload the cargo "W" from one of the shelves 6 in the warehouse shelving rack 3a or 3b and transfer the cargo onto the cargo platform 7, the transporter 1 is first stopped facing the shelf. Then, the first drive 11 moves the traverser 9 with the upright transfer arms 10a and 10b, until the traverser is in its foremost position. The traverser 9 and the transfer arms 10a and 10b, all moving right over the partition 5 in the shelving rack 3a or 3b, do not interfere with any cargo "W" in the shelves 6 separated by the partitions.

Upon arrival at their foremost position where the traverser 9 is stopped, the second drive 12 lowers the upright transfer arms 10a and 10b. The motor 20 equipped with a reduction gear box shown in detail in FIG. 3, is actuated to rotate the driving rotor 21. This rotor which has been in contact with the stopper 25a as shown in solid lines in FIG. 3b, now turns to contact the other stopper 25b. As a result, the wire rope 23 is pulled by the rotor by a distance such that the rope end retainer 18 in the traverser 9 causes the rotatable shaft 15 to turn against the coiled springs 19a and 19b, thereby lowering the transfer arms 10a and 10b to a predetermined extent.

Figure 8:
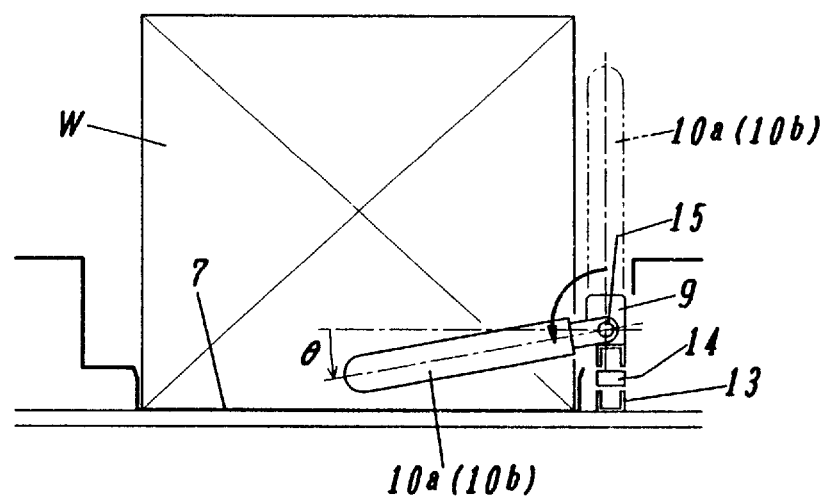
FIG. 8 is a front elevational view of another modification of the first embodiment.
Figure 9:
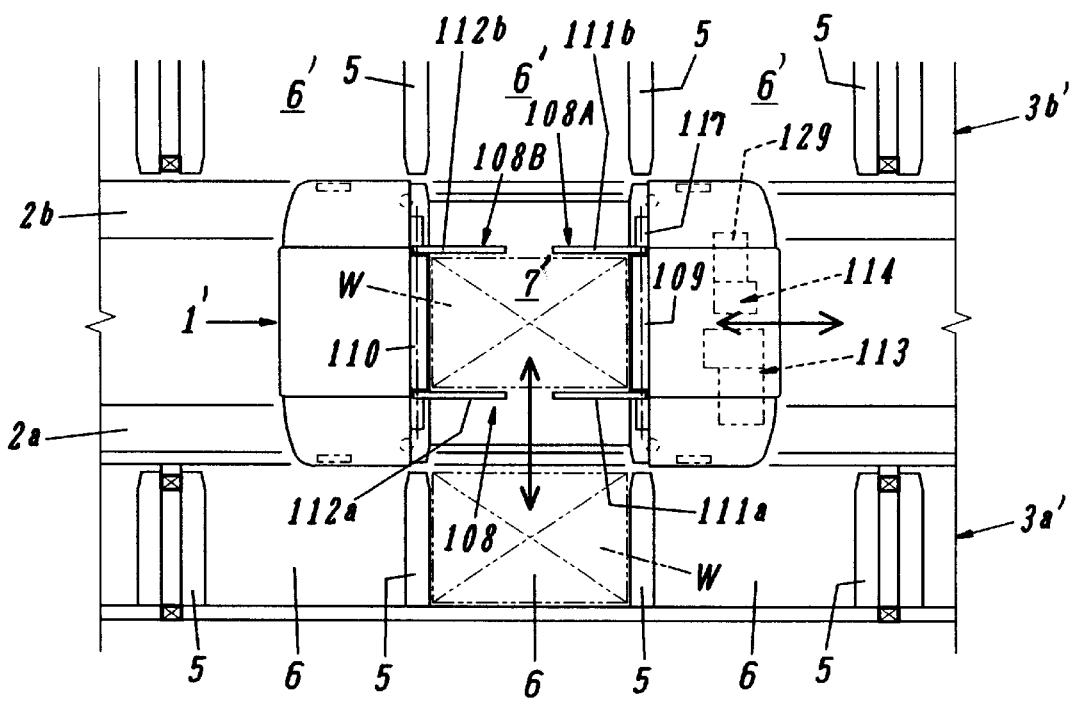
FIG. 9 is a plan view of two instrumentalities for transferring cargo in a second embodiment of the invention, with the apparatus being installed in the transporter and cooperating with the shelving racks which are shown in part.

It may be desireable to lower the arms 10a and 10b by an angle θ (for example 10°) beyond the 90° angle at which they would lie horizontally on the cargo platform 7, as shown in FIG. 8. The free ends of the lowered arms face a wall portion close to a bottom of the cargo "W". In this case, the angular position of the stopper 25b was changed so that the rotor 21 pulls the wire rope 23 by an additional distance lowering the arms 10a and 10b by the desired angle exceeding 90°.

The entire path of wire rope 23 remains unchanged over its length in spite of the movement of the traverser 9 relative to the intermediate rail 14 which also moves in the same direction. Therefore, there will be no change in the tension of the wire rope 23 to turn the rotatable shaft 15, unless the drive rotor 21 is driven to pull the wire rope.

The transfer arms 10a and 10b are lowered, one in front of the other behind the cargo "W", on the shelf 6 in the shelving rack 3a or 3b. The first drive 11 then retracts and pulls the traverser 9 into its home position on the cargo platform 7 on the transporter 1. One of the transfer arms 10a or 10b behind the cargo "W" pushes it towards the cargo platform 7 until the cargo is transferred thereon from the shelf 6 on the same level.

When the cargo "W is unloaded from the platform 7 of the transporter 1 onto a shelf 6 in the shelving rack 3a or 3b, the transporter is stopped at a desired position. One of the arms on the traverser lies in front of and the other lies behind the cargo, similarly to their positions when the transfer of the cargo onto the rigid bed has been completed. The first drive 11 then moves the traverser 9 to its foremost position while the arm 10a or 10b behind the cargo pushes and smoothly transfers it from the cargo platform into the shelf 6 of the shelving rack, located at the same level as the platform. As shown in FIG. 3, the motor 20 is actuated so that the driving rotor 21 is driven in the reverse direction to leave the stopper 25b from its position shown in broken lines to its home position in contact with the other stopper 25a as shown in solid lines. At the same time the wire rope 23 moves toward the traverser 9 so that the rotatable shaft 15 therein is turned in the reverse direction by the torsion springs 19a and 19b. Due to this reverse rotation of the shaft 15, the wire rope 23 is taken up by the rope end retainer 18, and the lowered transfer arms 10a and 10b are raised to take their upright resting positions.

Figure 7:
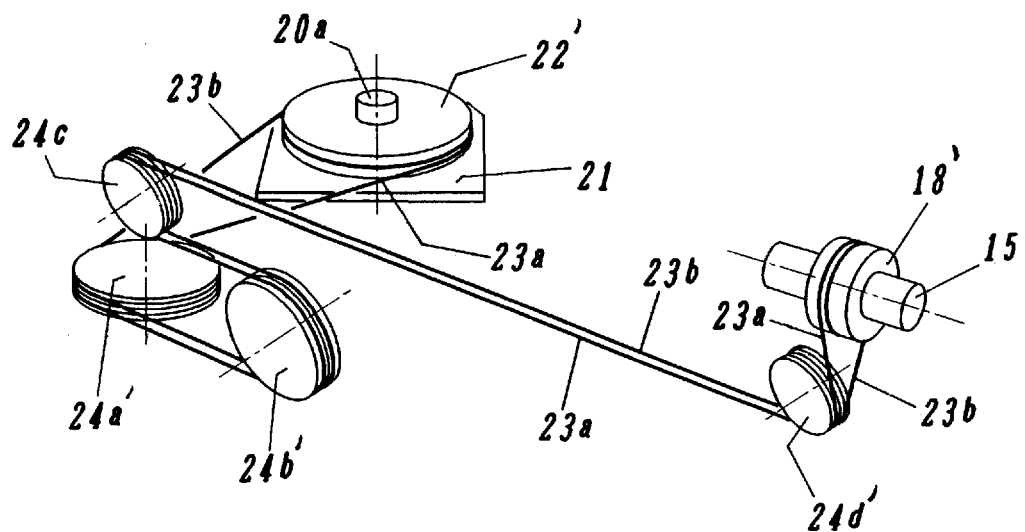
FIG. 7 is a perspective view showing a modification of the first embodiment.

The coiled torsion springs 19a and 19b employed in this embodiment urge the lower arms 10a and 10b toward their upright positions. However, as shown in the embodiment of FIG. 7, an additional wire rope may be employed instead of the coil springs 19a and 19b. In this modification, a wire rope 23a lowers the arms 10a and 10b to their lowered positions when the rotor 21 rotates forward, with the other rope 23b raising them to their upright positions when the rotor turns in the reverse direction. One end each of the ropes 23a and 23b turns partially around the pulley 22 in opposite directions and is attached to the periphery thereof. The other end of each rope also turns partially around the rope end retainer 18' in opposite directions and each is attached to the periphery thereof. Each of the guide rings 24a'–24d' has two annular grooves in its periphery. In this embodiment the two wire ropes 23a and 23b can also form a single endless rope.

Another, a second embodiment of the present invention is shown in FIGS. 9 to 13, which differs from the first embodiment of the present invention with respect to its transfer apparatus. The electric car serving as the transporter 1' as well as the shelving racks 3a and 3b are the same as those in the first embodiment.

Pairs of transfer mechanisms 108A and 108B, are installed in the transporter 1' and constitute a dual mechanism for transferring cargo. The transfer mechanism extends along the opposite sides of the cargo platform 7', and respectively comprise the traversers 109 and 110 which are extendible in and retractable from a direction in which the cargo is transferred. Pairs of transfer arms 111a and 111b, and 112a and 112b, are respectively disposed at respective forward and rearward ends of each traverser 109 and 110. A first drive 113 drives the traversers 109 and 110 together and in the same direction. A second drive 114 raises and lowers the transfer arms together.

Figure 10:
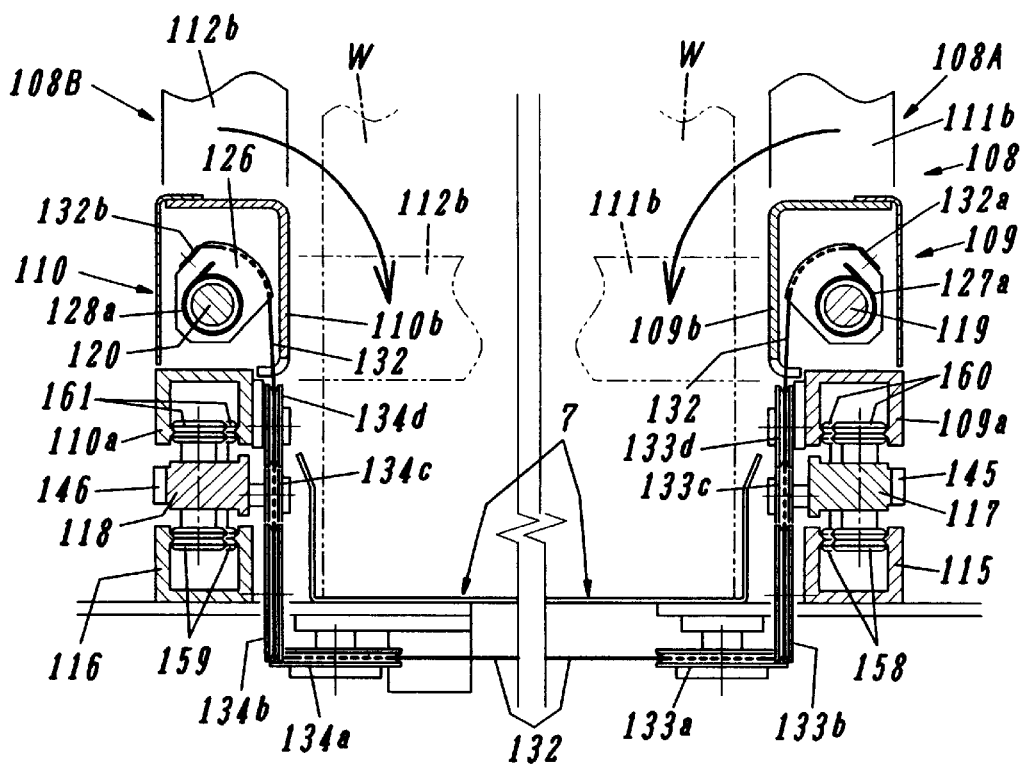
FIG. 10 is a vertical cross sectional view of some principal parts of the instrumentalities of FIG. 9.
Figure 11:
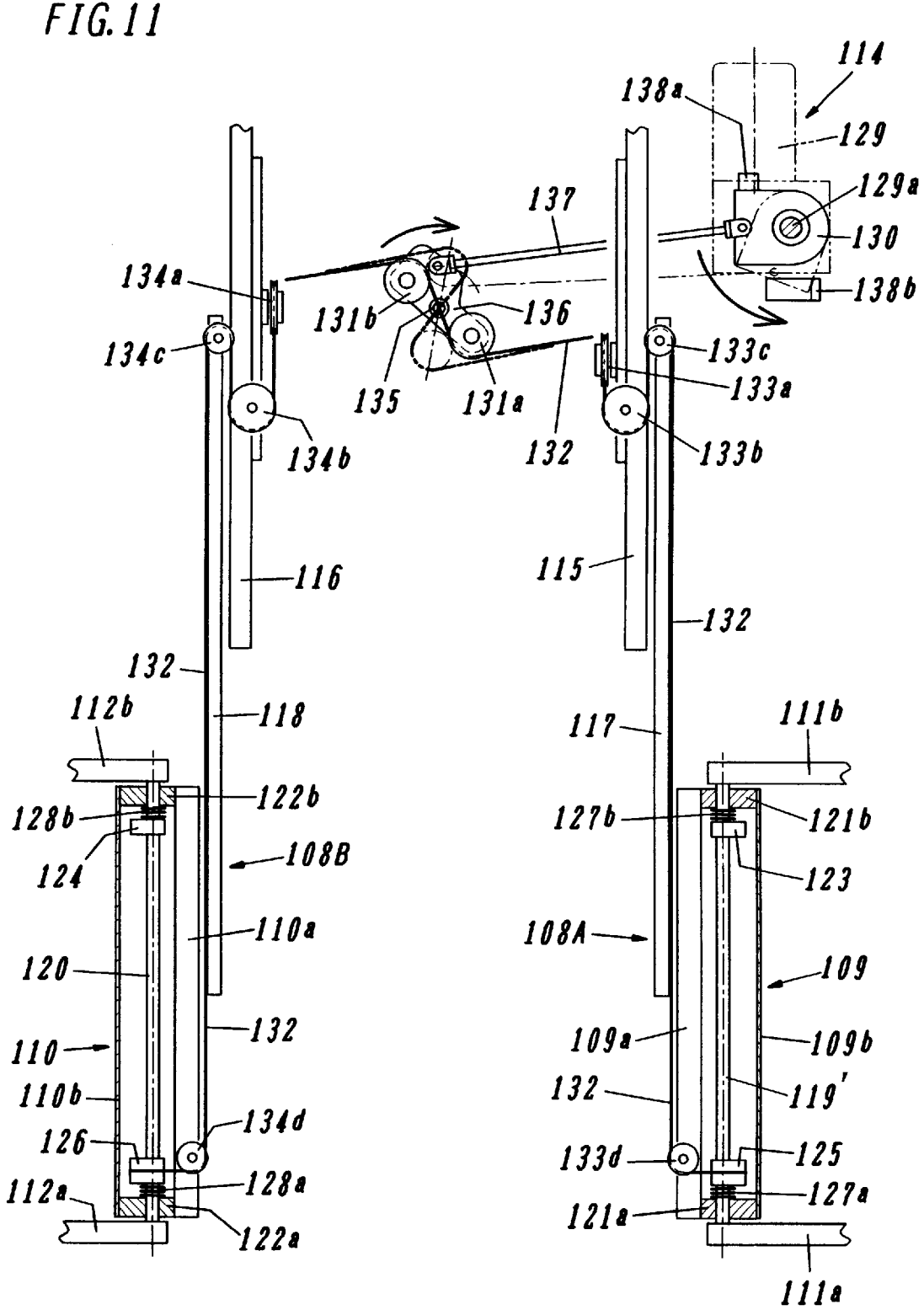
FIG. 11 is a combination of side elevational view of the instrumentalities of FIG. 9, with a plan view of a second drive wherein the side elevations of principal parts of the left and right instrumentalities are lowered outwardly in opposite directions for convenience of description, and wire ropes are driven by a common actuator.

As shown in FIGS. 10 and 11, the traversers 109 and 110 each have a respective base 109a, 110a, and a respective cover 109b, 110b is displaceably supported on movable intermediate rails 117 and 118, respectively. Those rails 117 and 118 in turn are displaceably supported respectively on fixed rails 115 and 116. The displaceability of the movable intermediate rails 117 and 118 allows the traversers 109 and 110 to be extended and retracted in the cargo transfer directions. When the traversers departs from their home positions beside the cargo platform 7' on the transporter 1' and approach their respective extended positions in and beside the shelf 6' and the rack 3a' or 3b'. That movement takes place when the traversers 109 and 110 move outward relative to the intermediate rails 117 and 118 which also move outwardly but to a lesser extent, and both move outward relative to the fixed rails 115 and 116. Rotatable shafts 119 and 120 are disposed each in a respective traverser 109, 110 their reciprocating direction. Base portions of the transfer arms 111a and 111b, and those of the transfer arms 112a and 112b are attached from the shafts 119 and 120, respectively. Bearings 121a and 121b supporting the shaft 119 are disposed at opposite ends of the traverser 109, with other bearings 122a and ends of the traverser 109, with other bearings 122a and 122b supporting the shaft 120 being also disposed at opposite ends of the other traverser 110.

Each of spring retainers 123 and 124 and each of rope end retainers 125 and 126 are secured to each end of each rotatable shaft 119 and 120. Coil springs 127a, 127b loosely fit on ends of the shaft 119 located respectively between the retainer 125 and the bearings 121a, and between and other retainer 123 and the other bearing 121b. Further coil springs 128a and 128b loosely fit on end portions of the other shaft 120 located respectively between the retainer 126 and the bearing 122a, and between the other retainer 124 and the other bearing 122b. Each of the coil springs 127a and 127b has an end fixed to the bearing 121a or 121b, and another end fixed to the retainer 125 or 123. Similarly, each of the coil springs 128a and 128b has an end fixed to the retainer 126 and 124. Thus, those springs always urge the transfer arms 111a, 111b, 112a and 112b towards their upright position.

The second drive 114 comprises a drive rotor 130 attached to a vertical output shaft 129a extending from a reduction box of an electric motor 129. The drive 114 further comprises pulleys 131a and 131b disposed beneath a central portion of the cargo platform 7, and as shown best in FIG. 10, a single wire rope 132 having its opposite ends 132a and 132b attached to respective peripheral portions of the rope end retainers 125 and 126. The second drive 114 also has a first set of first to fourth guide rings 133a–133d, and a second set of first to fourth guide rings 134a–134d. The pulleys 131a and 131b are rotatably supported on opposite ends of a rocking member 136 which is pivoted form a vertical shaft 135 to permit the rocking of the member in a horizontal plane. One end of a link 137 is attached to an end of the rocking member 136, and the other end of the link is eccentrically attached to the driving rotor 130, to be rocked thereby.

As best shown in FIG. 11, an intermediate portion of the wire rope 132 is located between the distal ends 132a and 132b thereof. That intermediate portion engages with the pair of the pulleys 131a and 131b, causing the rope to assume an S-shape. Halves of the wire rope 132 extend from that intermediate portion to its respective distal ends 132a and 132b. Each half of the wire rope 132 turns around a respective first guide ring 133a, 134a. Those rings are each rotatably supported on vertical shafts which are located respectively at middle portions between longitudinal ends of the respective fixed rail 115, 116. The first guide rings 133a and 134a deflect their halves of the wire rope 132 from their initial paths to succeeding paths each of which runs parallel to the adjacent fixed rails. Each half of the wire rope then advances to a respective second guide ring 133b, 134b, which are each rotatably supported on horizontal shafts attached to side walls of each fixed rail 115 and 116. Those second guide rings 133b and 134b guide the wire rope halves to their respective return paths, and the third guide rings 133c and 134c again deflect the rope halves from their return paths to their forward paths respectively running parallel to their adjacent intermediate movable rails 117 and 118. The third guide rings 133c and 134c are each rotatably supported on horizontal shafts each attached to a rearward end of a movable rail. The elongate paths respectively continue to the fourth guide rings 133d, 134d each rotatably supported on their horizontal shafts respectively attached to a forward end of a base 109a, 110a of the respective traversers 109 and 110. The forward ends of the respective traversers are located most remotely from the third guide rings 133c and 134c. The respective fourth guide rings 133d and 134d deflect the wire rope halves respectively outwardly from their elongate paths, so that the forward end of each half of the wire rope turns around a respective rope end retainer 125 or 126, and is attached to a peripheral portion thereof. A pull on each half of the wire rope 132 causes the shafts 119, 120 to rotate in opposed direction to lower the transfer arm 111a, 111b, 112a, 112b, against the bias of the springs 127a, 127b, and 128a, 128b.

The arrangement of the shafts rotatably supporting the guide rings 133a–134d is such that each half of the wire rope always assumes an S-shape as shown in FIG. 11. Two curves in each of these S-shapes is defined by the second and third guide rings 133b, 133c, and 134b, 134c, in whichever direction the traverser 109 or 110 moves accompanied by the intermediate rails 117, 118 (to the right or to the left in the drawing). The drive rotor 130 is driven forward and backward at an angle defined between stoppers 138a and 138b. One stopper 138b bears against the rotor 130 to delimit its turning forward as shown with an arrow in FIG. 11. This turning of the drive rotor causes the rocking member 136 to pivot about the shaft 135 thereby increasing the tension of the halves of wire rope wound around the pulleys 131a, 131b. The stopper 138b can be angularly displaced so that an angle is adjustable between each of lowered transfer arms 111a–112b and the horizontal plane. Alternatively, additional stoppers can be employed for this purpose and attached to the spring retainers 123 and 124, to the rope end retainers 125 and 126, or to lugs attached to the rotatable shaft 119 and 120 in the traversers 109 and 110.

Figure 12:
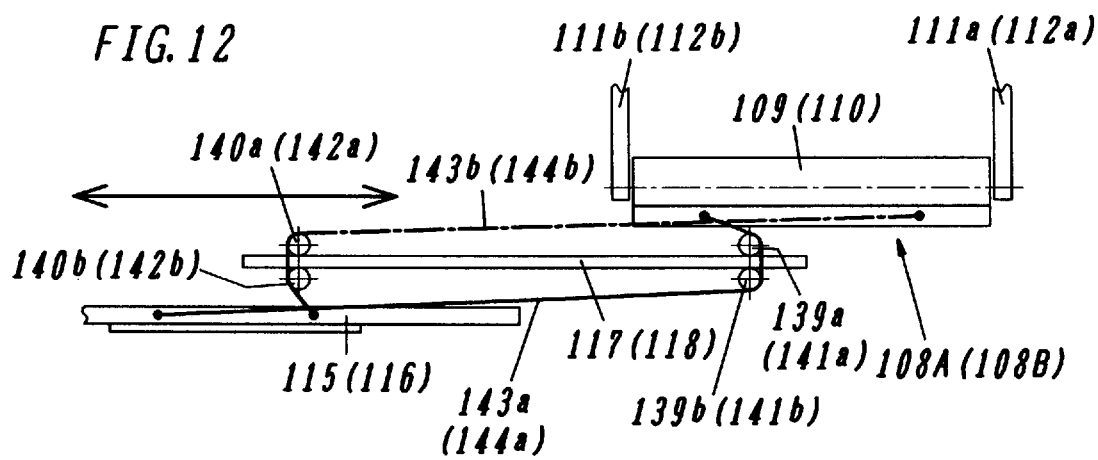
FIG. 12 is a schematic side elevational view of a first drive for moving a traverser in each instrumentality.
Figure 13:
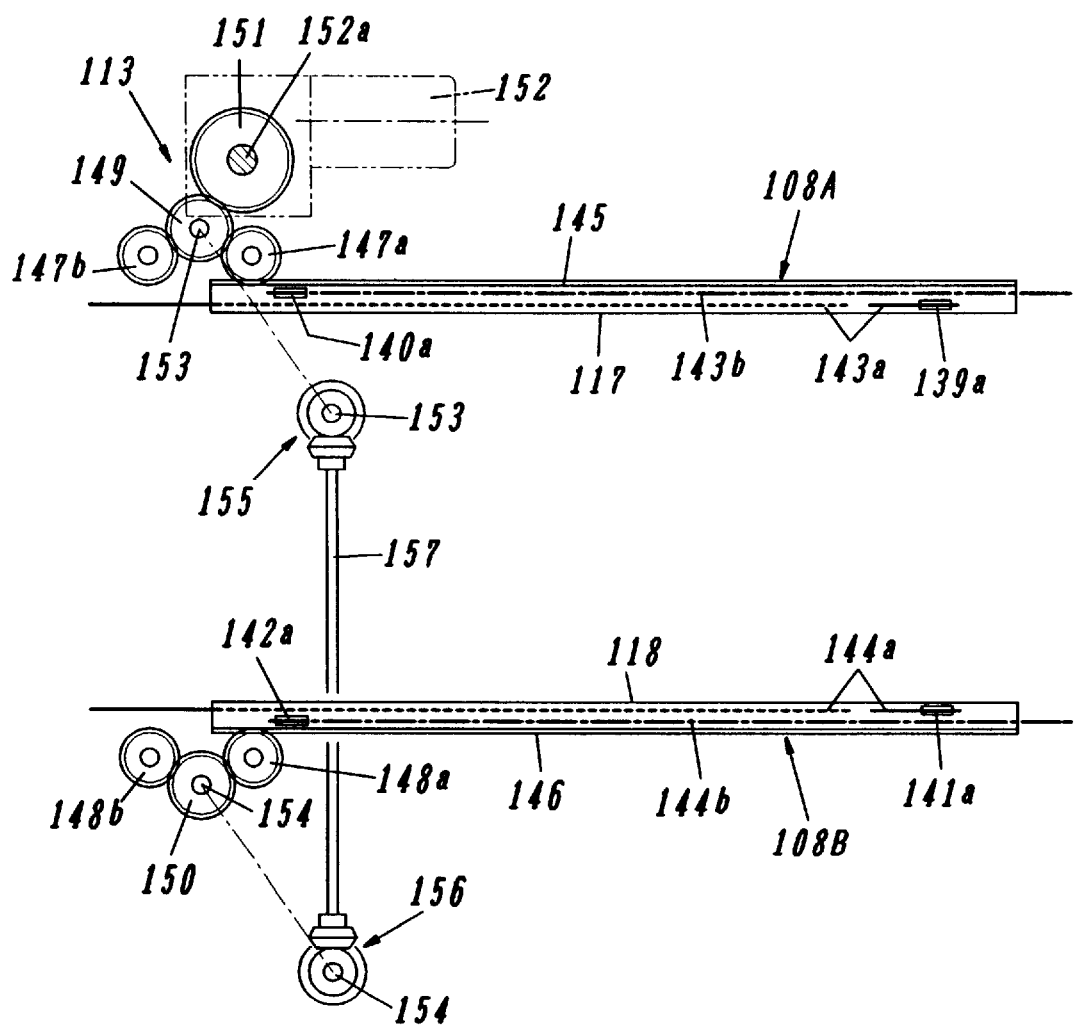
FIG. 13 is a plan view of a mechanism employed in the first drive for driving an intermediate movable rail.

An example of a first drive 113 for driving the traversers 109 and 110 to move forward and backward is shown in FIGS. 12 and 13. Upper and lower front sprockets 139a and 139b are rotatably supported at the front end of the movable intermediate rail 117. Rotatably supported rear upper and lower sprockets 140a and 140b are disposed at the rear of the movable rail 117. Similarly, upper and lower front sprockets 141a and 141b are rotatably supported at a forward end of the intermediate movable rail 118. Rotatably supported rear sprockets 142a and 142b are likewise disposed up and down at a rearward end of the movable rail 118 of the other traverser. Drive chains 143a and 143b are each attached at one of their ends to the fixed rail 115, and attached at the other of their respective ends to the traverser 109. Each drive chain 144a and 144b is attached at one of their end to the fixed rail 116, and attached at the other of their respective ends to the other traverser 110. As shown in FIG. 12, an intermediate portion of one chain 143a (or 144a) turns around the forward sprockets 139a and 139b (or 141a and 141b), and an intermediate portion of the other chain 143b (144b) turns around the rear sprockets 140a and 140b (or 142a and 142b). Toothed racks 145 and 146 respectively formed in side walls of the movable rails 117 and 118 extend along their respective lengths. The first drive 113 further includes pinions 147a and 147b of identical diameter and pinions 148a and 148b on the opposite side, also of identical diameter, wherein the pinions 147a, 147b being engageable with the toothed rack 145, and the pinions 148a, 148b being engageable with the toothed rack 146. An idler gear 149 always meshes with the pinions 147a and 147b, and idler gear 150 meshes with the pinions 148a and 148b. A single drive gear 151 is attached to a drive shaft 152a and meshes with only one of the idler gears 149. The drive shaft 152a extends from a reduction box of an electric motor 152. The idler gears 149 and 150 are respectively attached to shafts 153 and 154, which are connected to each other by a transmission shaft 157 through sets of bevel gears 155 and 156. The transmission shaft 157 is disposed beneath the cargo platform 7', together with the rocking member 136 of the second drive 114 for the transfer arms.

When the motor 152 is turned on to rotate the drive gear 151, the pinions 147a, 147b of the transfer mechanism 108A are driven to rotate in the same direction. The transmission shaft 157 rotates the other pinions 148a, 148b also in the same direction. The pinions meshing with the toothed racks 145, 146 respectively in the intermediate movable rails 117, 118 move these rails forward or backward (to the right or to the left in the drawings). Consequently, and similarly to the first embodiment, the traversers 109, 110 advance in the same direction as the intermediate rails 117 and 118. This also applies to the backward movement of the traversers 109 and 110 accompanied by the backward moving intermediate rails 117, 118.

Only one of the pinions 147a and 148a respectively located in front of the other pinions 147b and 148b remains engaged with the rack gears 145 and 146 in the intermediate rails 117 and 118 when they advanced to their foremost positions. A plurality of circumferentially grooved rollers 158–161 are shown in FIG. 10. These are similar to those in the first embodiment shown in FIG. 2

In operation to unload the cargo "W" from one of the shelves 6' in the shelving racks 3a' and 3b', and transfer the cargo onto the cargo platform 7', the transporter 1' is stopped, opposite to the shelf in question. Then, the first drive 113 moves the traversers 109 and 110, each with their respective transfer arms 111a and 111b in the transfer mechanism 108A, or 112a and 112b in the other transfer mechanism 108B in their upright position, until the traversers arrive to their foremost extended positions.

There the traversers 109 and 110 are stopped, and the second drive 114 lowers the transfer arms 111a–111b. In detail, the electric motor 129 with its reduction gear box shown in FIG. 11, is actuated to rotate the drive rotor 130. This rotor has been in contact with one stopper 138a, turns in a forward direction to come into contact with the other stopper 138b. The link 137 pivots the rocking member 136 about its shaft 135. As a result, the pulleys 131a and 131b will pull both halves of the wire rope 132 towards one another at the intermediate portion of the wire ropes. The rope end retainers 125 and 126 in the traversers 109 and 110 respectively turn the rotatable shafts 119 and 120 against the bias of the springs 127a–128b, thereby lowering the transfer arms 111a–112b by a predetermined angle into the shelf 6'.

The path of the wire rope 132 remains unchanged over its entire length, in spite of the movement of the traversers 109, 110 relative to the intermediate rails 117, 118 which also move in the same direction. Therefore, no change occurs in the tension of the wire rope 132 when turning the rotatable shafts 119, 120 unless the drive rotor 130 is also driven to pull the wire rope.

The transfer arms 111a–112b are lowered with the arms 111b–112b in front of, and the arms 111a, 112a behind the cargo "W", which is still on the shelf 6' in the shelving rack 3a' or 3b'. The first drive 113 then retracts and causes the traversers 109, 110 to take their respective home positions beside the cargo platform 7' on the transporter 1'. The transfer arms 111a and 112a in rear of the cargo "W" will thus push it towards the cargo platform 7' until the cargo is transferred onto it from the shelf 6' which is at the same height as the platform.

When unloading the cargo "W" from the platform 7' of the transporter 1' and loading it into one of the shelves 6' in the shelving rack 3a' or 3b', the transporter carrying the transfer arms 111a–112b in the transfer mechanisms 108A and 108B is stopped at a desired position. In this state, one set of arms 111a and 112a on the traversers lie in front of, and the other set of arms 111b and 112b are behind the cargo, similarly to their respective positions when the transfer of the cargo onto the cargo platform 7' was finished. The first drive 113 extends the traversers 109 and 110 to their foremost position, and during that movement the arms 111b and 112b in behind the cargo push and smoothly transfer it from the platform 7' of the transporter into the shelf 6' of the shelving rack, since the shelf is located at the same level as the cargo platform. The motor 129 shown in FIG. 11 is actuated so that the drive rotor 130 is driven in reverse to move from the stopper 138b toward its home position in contact with the other stopper 138a. At the same time the engagement of the wire rope 132 by the pulleys 131a and 131b is loosened, whereby the rotatable shafts 119' and 120 in the traversers 109 and 110 are turned in respective directions due to the urging of the respective springs 127a–128b. Due to the reverse rotation of the shafts 119, 120 the ends 132a and 132b of the wire rope 132 are respectively taken up by the rope end retainers 125 and 126, and the lowered arms 111a–112b are raised to their upright positions.

The springs 127a–128b always urge the transfer arms 111a–112b in opposite angular directions so that the single wire rope 132 in the second embodiment has to displace the arms in the other angular direction against the urging force of the springs. However, the springs can be dispensed with if a pair of wire ropes are employed instead, so that one rope forces the arms to rise and the other rope forces them to be lowered.

FIGS. 14–17 show a third embodiment of the present invention. This embodiment of the cargo transfer apparatus 201 has a cargo platform 203 so that cargo "W" can be transferred between the platform and a shelf 202, through a horizontal transfer path. The apparatus 201 further comprises traversers 204 and 205 disposed along the side of the transfer path, and a first drive 206 for extending and retracting the traversers. Transfer arms 207a and 207b, and further transfer arms 208a and 208b are provided, wherein arms 207a and 208a are pivoted from a forward end of each traverser 204, 205, and transfer arms 207b and 208b are pivoted from the rear end or each traverser. A second drive 209 raises and lowers the arms together. Similarly to the cargo platform 7 in the first embodiment, and the cargo platform 7' in the second embodiment, the platform 203 for slidably supporting the cargo can be a simple rigid plate fixed to the transporter. Alternatively, the platform 203 can be a conveyor 210 if the cargo "W" requires it, as is the case in the illustrated example. The conveyor for moving the cargo can be a belt conveyor, roller conveyor of the like, of any suitable type. For example, the belt in the conveyor can be driven at the same speed as the cargo, and the rollers in the conveyor can freely revolve about their own axes.

Figure 14:
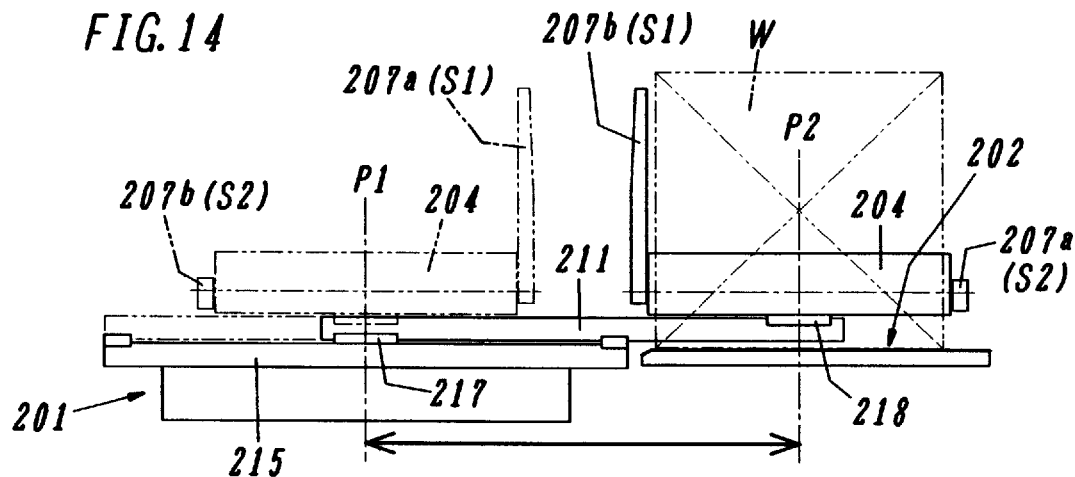
FIG. 14 is a schematic side elevational view of a third embodiment of a cargo transporting apparatus of the present invention, wherein a shelf in the rack is shown being served by the apparatus.
Figure 15:
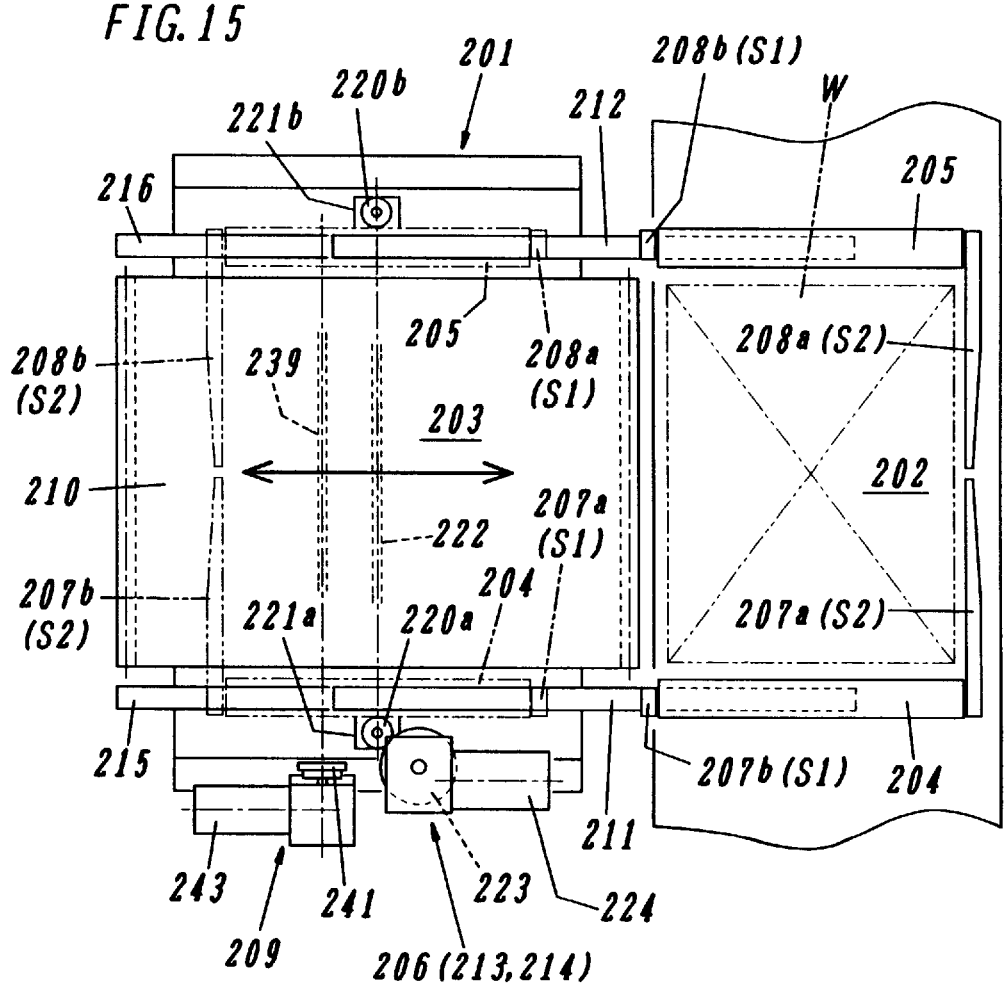
FIG. 15 is a plan view corresponding to FIG. 14.

The first drive 206 assures that the traversers 204 and 205 reciprocate between their retracted position P1, as shown in FIG. 14, beside the platform 203 and their extended position P2 within the shelf 202. The first drive 206 includes intermediate movable rails 211 and 212, a first driver 213, and a second driver 214. The intermediate movable rails 211 and 212 are displaceably supported from the platform 203 adapted to move in a direction in parallel with the transfer path and to support and allow the traversers 204 and 205 to be displaced also in parallel with the transfer path. The first driver 213 extends and retracts the intermediate movable rails 211 and 212 forward and backward along the transfer path with the second driver 214, displacing both of the traversers 204 and 205 together with and relative to the intermediate rails.

The first drive is described with reference to FIGS. 14–17 and FIG. 21. Sliding guides 217 are disposed on fixed rails 215 and 216 and support the intermediate rails 211 and 212, respectively forward and backward movably in the transfer direction. Sliding guides 218 are disposed under the traversers 204 and 205, which in turn are disposed above the intermediate rails, respectively supporting the fixed rails for forward and backward movement thereon in the transfer direction. The first driver 213 in the first drive 206 includes a toothed rack 219 each formed in a side of each of the intermediate rails 211 and 212, and pinions 220a and 220b each meshing with the corresponding toothed rack 219. The first driver further includes two sets of bevel gears 221a and 221b respectively meshing with the pinions, a transmission shaft 222 connecting the bevel gears on each side to one another, and a drive gear 223 attached to a shaft extending from a motor 224 having an integral reduction box, wherein the single drive gear is meshed with one of the pinions 220a.

The second driver 214 in the first drive 206 includes sprockets 255a and 255b rotatably supported on respective horizontal shafts, which are attached to the outer sidewall portions of forward and rear ends of each intermediate rail 211 and 212. The second driver further includes drive chains 226a and 226b each respectively engaging sprockets 225a, 225b. One end of each chain is attached to an intermediate portion between the forward and rear ends of the corresponding fixed rail 215 or 216, and the other end of each chain is attached to an intermediate portion between the forward and rear ends of the corresponding fixed rail 215 or 216, and the other end of each chain is attached to an intermediate portion located between forward and rear ends of the corresponding traverser 204 or 205. A take-up mechanism can be provided for any slack in each chain 226a and 226b, if necessary.

In operation of the first drive 206 of the structure described above, the motor 224 turns to rotate the pinions 220a and 220b displacing thereby the intermediate rails 211 and 212 at the same speed and in the same direction. Consequently, the chains 226a and 226b cause the traversers 204 and 205 to move together with the intermediate rails at the same speed and in the same direction. If, as result, the first driver 213 drives each intermediate movable rail 211 and 212 half a distance between the retracted position P1 and the extended position P2 shown in FIG. 14, then each traverser 204 and 205 advances the full distance between the positions P1 and P2, relative to the fixed bed 203. A forward half of each intermediate rail 211 and 212 which has advanced to its foremost position P2 protrudes sideways outwardly of the cargo platform 203. Thus, each traverser 204, 205 is entirely supported on the extended forward half of the intermediate rail and protrudes in its entirety out of the platform 203 in the shelf 202.

Figure 16:
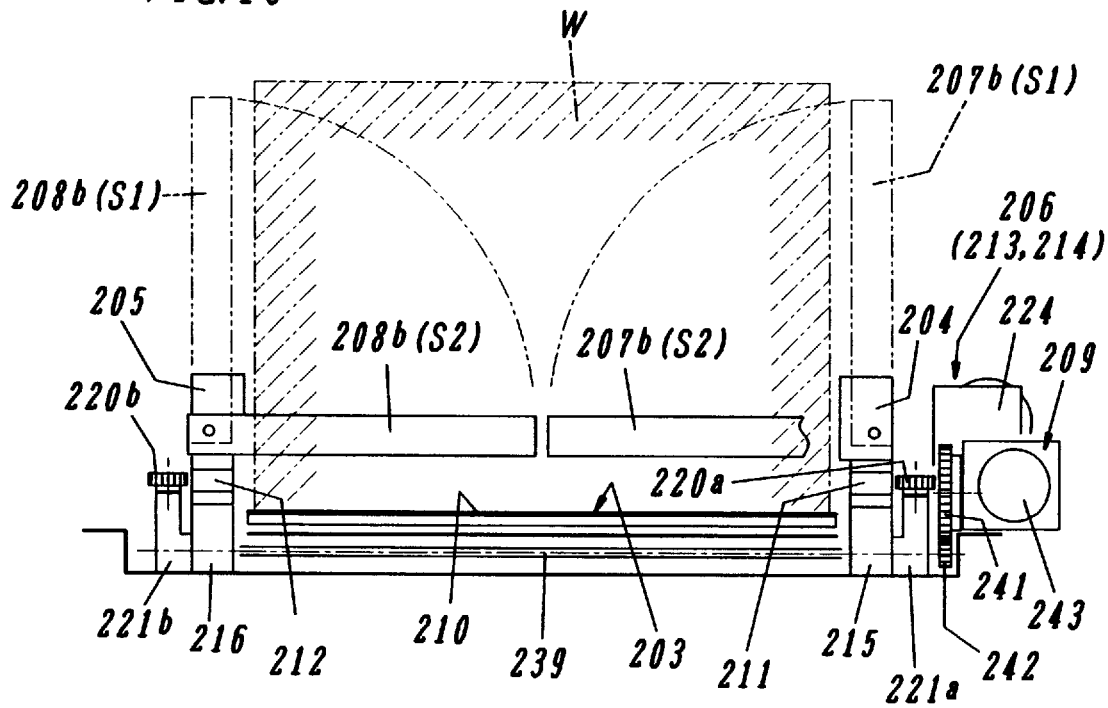
FIG. 16 is a rear elevational view of transfer arms assuming their lowered position in the apparatus, with a portion thereof being cut off.
Figure 17:
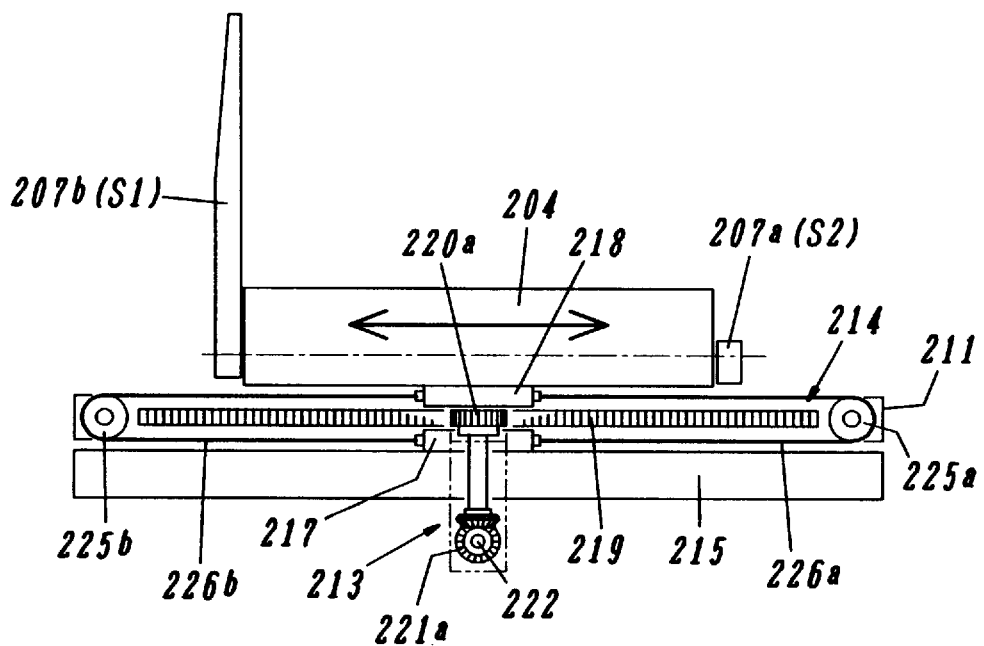
FIG. 17 is a schematic side elevational view of a first drive for moving a traverser in the apparatus.
Figure 20:
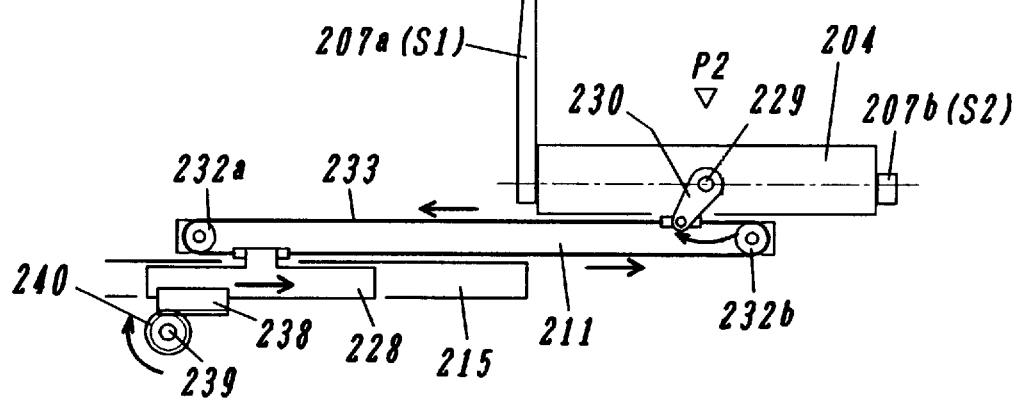
FIG. 20 is yet another side elevational view of the second drive with the traverser being at its extended position.
Figure 21:
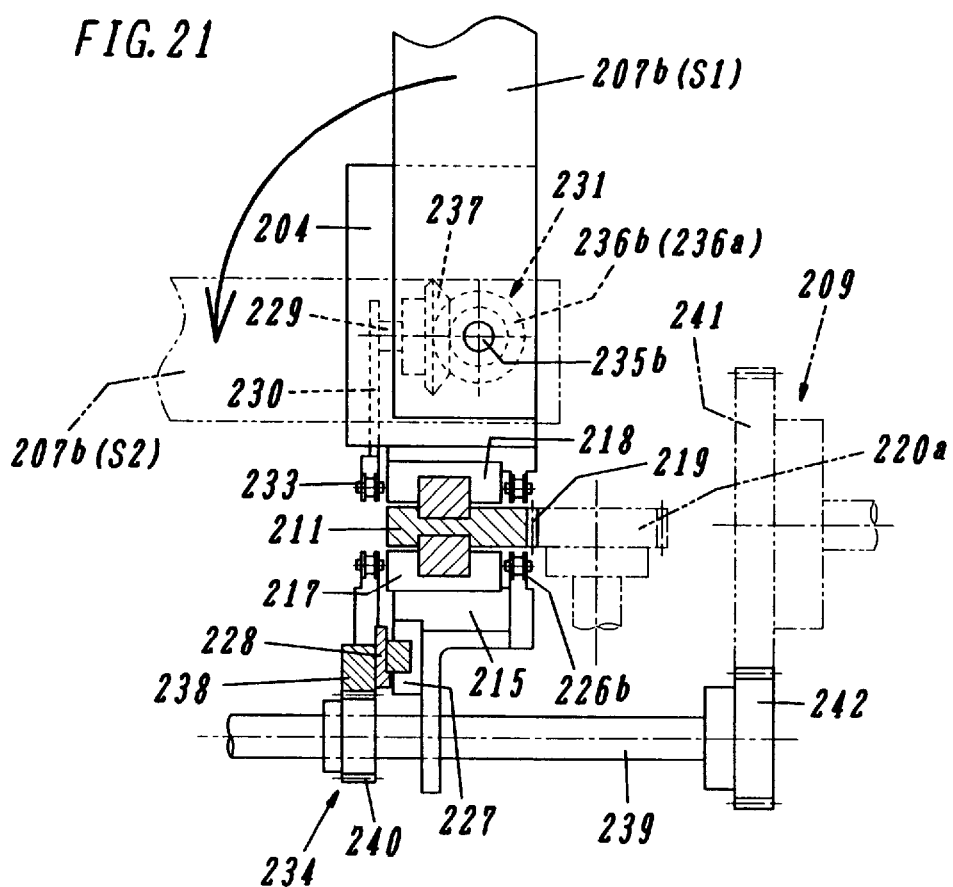
FIG. 21 is a rear elevational view of the first and second drives the principal portions of which are shown in vertical cross-section.

As best shown in FIGS. 16 and 21, the second drive 209 moves the transfer arms 207a–208b to swing between their retracted raised position S1 and their lowered active position S2 in the transfer path. As shown in FIG. 15 and FIGS. 18 to 22, the second drive 209 includes a driven member 228 supported by a sliding guide 227 and installed in each fixed rail 215 and 216.

The second drive 209 further includes a rocking lever 230 pivoted on a horizontal shaft 229 protruding sideways from an intermediate portion located between the forward and rear ends of each traverser 204 and 205. The rocking lever 230 is swingable forward and backward. The second drive 209 also includes an internal transmission 231 in each traverser to change the rocking motion of the lever 230 into a swinging motion of the transfer arms 207a–208b; sprockets 232a and 232b; a transmission cable such as a drive chain 233; and a drive mechanism 234 to move the driven member 228 forward and backward. The sprockets 232a and 232b are rotatably supported outwardly protruding on horizontal shafts attached to forward and rear ends of each of intermediates rail 211 and 212. The transmission cable 233 is spanned between the sprocket 232a and 232b, with its ends attached to the driven member 228. An intermediate portion of the transmission cable 233 is connected to the rocking lever 230, at its end opposite to its pivot shaft 229.

The internal transmission 231 includes rotatable split shafts 235a and 235b within the traversers 204 and 205. Those split shafts extend along and coaxially with each traverser and transfer arms 207a and 207b, or 208a and 208b, are attached to the outer ends of those shafts. Bevel gears 236a and 236b are attached, facing on another, to the inner ends of the split shafts 235a, 235b. A common bevel gear 237 meshes with both bevel gears 236a, 236b facing on another, and is connected by the horizontal shaft 229 to the rocking lever 230. Therefore, upon movement of the rocking lever 230, not only the transfer arms 207a and 207b will swing in opposite angular directions, but the other transfer arms 208a and 208b will do so as well.

The drive mechanism 234 has toothed racks 238 each attached to an inner surface of a forward or rear end of the driven member 228 in the corresponding fixed rail 215 or 216. Pinions 240 attached to a common transmission shaft 239 are meshed with the respective toothed racks 238. A motor 243 having an integral reduction gear box drives the common transmission shaft 239 through gears 241 and 242.

Figure 18:
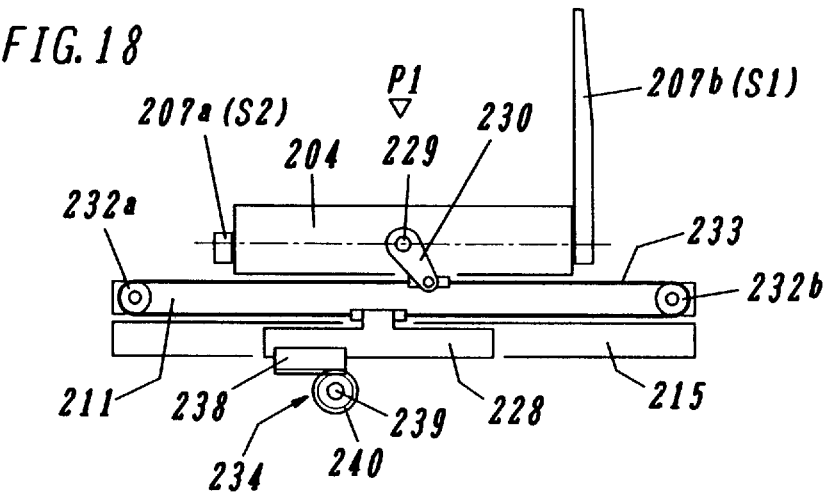
FIG. 18 is a side elevational view of a second drive for swinging the transfer arms, with the traverser in its retracted position.
Figure 19:
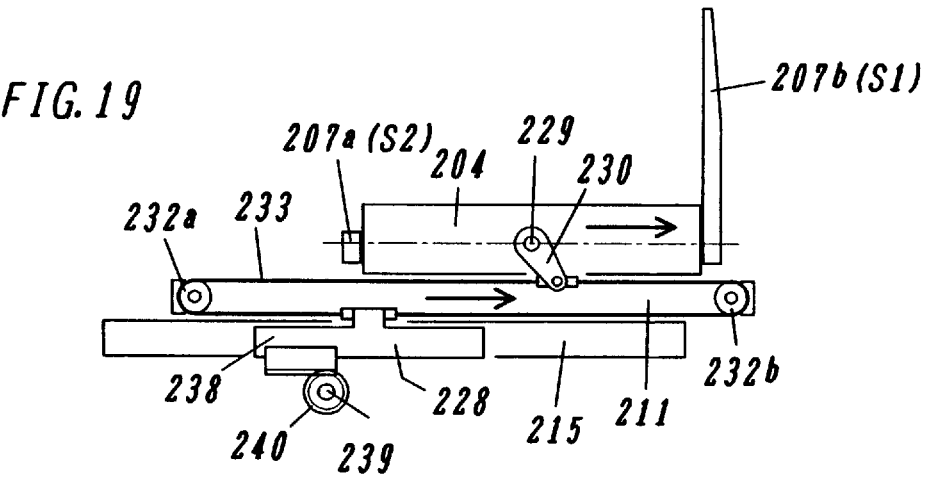
FIG. 19 is another side elevational view of the second drive with the traverser being at its intermediate position.

If the transfer arms 207a–208b are prevented by a resistance from swinging, the transmission cable 233 of the second drive 209 operates as shown in FIGS. 18 and 19. As the traversers 204 and 205 are driven forward and backward relative to the intermediate rails 211 and 212, the transmission cable 233 merely rotates around the sprockets 232a and 232b. The rocking lever 230 will not change its position relative to the transmission cable 233. Consequently, the transfer arms 207a–208b which are in their raised position S1 or lowered position S2 will not change that position to the lowered position S2 or raised position S1, respectively.

The second drive 209, however alters the position of those arms 207a–208b, if the motor 243 in the driving mechanism 234 is turned on to rotate the pinions 240 connected to the transmission shaft 239. As shown in FIG. 20, those pinions meshing with the toothed racks 238 displace the driven members 228 relative to the fixed rails 215 and 216. The transmission cable 233, such as a drive chain consequently turns by an angle around the respective intermediate rails 211 and 212, thereby rocking the lever 230 that is pivoted from each traverser 204 and 205. As a result, the arms 207a and 208a shift their position in a direction that is reverse to that in which the other arms 207b and 208b shift. For example, the arms 207a and 208a are lowered the position S2, and the arms 207b and 208b are raised to the position S1.

Figure 22:
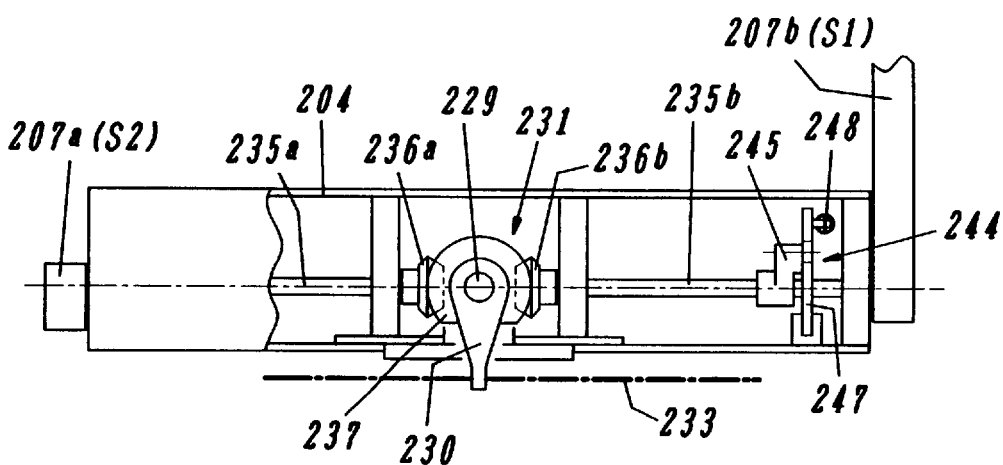
FIG. 22 is a side elevational view of the second drive means installed in the traverser, with a portion of the means being cut off.
Figure 23:
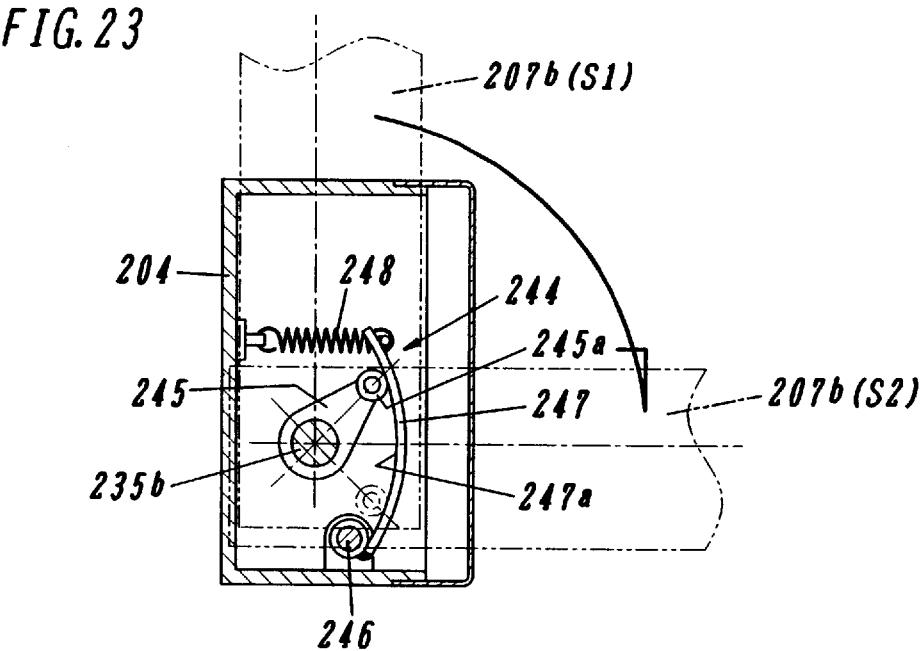
FIG. 23 is a front elevational view of a further means for urging the transfer arms toward their upright position.

Stoppers or the like (not shown) are provided to limit the angular displacement between the positions S1 and S2 of the arms to an angle (e.g., 90°). A locking means 244 such as shown in FIGS. 22 and 23 can be used to stabilize the arms 207a–208b either in the raised position S1 or the lowered position S2.

The locking means 244 can be disposed for each of the split shafts 235a and 235b having their outer ends fixed to the transfer arms 207a–208b, or only one locking means 244 is provided for one pair of the split shafts. FIG. 23 shows an example in which the locking means 244 is provided for the split shaft 235b. A cam follower 245 is formed as a lever affixed to the split shaft 235b. A cam 247 has an end pivoted from a shaft 246 which extends within the traverser 204 or 205 and in parallel with the split shaft 235b. A tension spring 248 urges the cam 247 towards the cam follower 245.

The inner surface 247a of the cam 247 is pressure contact with a roller 245a rotatably fixed to the free end of the lever-shaped cam follower 245. This follower 245 presses most intensely against the cam 247 at a change point, which corresponds to a neutral angle (e.g. 45°) between the raised and lowered positions S1 and S2 of the transfer arms 207a–208b. At the change point, the cam is displaced at a maximum distance in a direction against the bias of the tension spring 248. The greater the extend to which the arms 207a–208b swing away from the neutral angle either toward either position S1 or S2, the further will be the displacement of the cam 247 opposite to the direction of the bias of the spring 248. When the drive 209 has switched the position of the arms, the tension spring 248 retains the arms 207a–208b in their new position S1 or S2.

Figure 24:
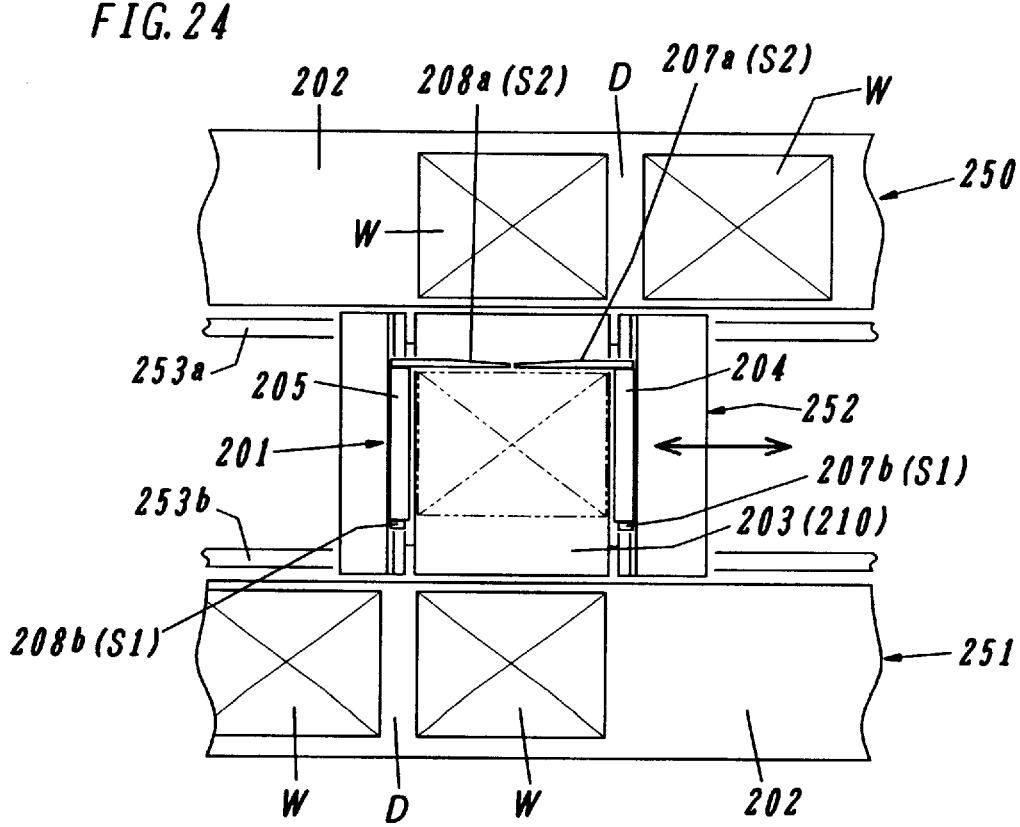
FIG. 24 is a schematic plan view of the apparatus in combination with the transporter.

The apparatus 201 of the hereinabove described structure for transfer of cargo can, for example, be mounted on transporter electric car 252 as shown in FIG. 24. This transporter is movable along a passage defined between the shelving racks 250 and 251, each containing the shelves 202 for storing cargo. The traversers 204 and 205 of this third embodiment 201 of the transporter of the present invention reciprocate along a horizonal transfer path that is perpendicular to the passageway in which the guide rails 253a and 253b guide the transporter 252.

Partitions for the shelves 202, similarly to those employed in the other embodiments shown in FIG. 1, are not required in this embodiment of the invention. Instead of such partitions, gaps "D" are provided between the adjacent cargo "W" arranged side by side in the shelves and in parallel with the passageway. As the traversers 204 and 205 each carry the transfer arms 207a–208b in their raised position S1 can freely move through the gaps "D". The cargo "W" similarly to the preceding embodiments, is smaller in length than the distance between the traversers 204 and 205 before and after the passageway, and is of a lesser width than the overall length of each traverser.

When the cargo "W" is unloaded from the shelf 202, the transporter 252 is stopped at a location next to the cargo. The transfer arms 207a and 208a (or 207b and 208b) closer to the cargo "W" are already raised or will be raised to their upright position S1 shown by broken lines in FIG. 14. The first drive 206 drives the traversers 204 and 205 from their retracted position P1 to their extended position P2. At this position P2, the forward and rear ends of each traverser protrudes outwardly from the forward and rear ends of the cargo "W", respectively.

Therefore, the second drive 209 will lower the forward arms 207a and 208b (or 207a and 208b) behind the cargo "W" to their position S2 as shown in solid lines in FIG. 14. The arms 207b and 208b (or 207a and 208a) in front of the cargo "W" swing upwardly to their raised position S1. The first drive 206 then retracts the traversers 204 and 205 towards their home position P1. In this manner, the cargo "W" to be unloaded is pushed by the pair of arms 207a and 208a (or 207B and 208b) behind the cargo "W", until it is transferred onto the cargo platform 203 (or conveyor 210). The platform 203 is level with the shelf 202, so that the cargo can easily be positioned in the center thereof.

The transporter 252 can then carry the cargo "W" thus received on the platform 203 (or conveyor 210) to any desired destination. At such destination, the cargo can be unloaded from the platform 203, or can be loaded into another shelf 202 of the same or different shelving rack 250 or 251, and such unloading operation, whether the cargo is loaded again into the another shelf or is simply unloaded. Upon arrival to the desired destination, the arms 207a and 208a (or 207b and 208b) that are in their lowered positions, are raised to their upright position S1, while the other arms 207b and 208b (or 207a and 208a) are lowered to take their position S2. The traversers 204 and 205 are next extended outwardly from the transporter.

Thus, as the traversers 204 and 205 extend towards their foremost position P2 the arms 207b and 208b (or 207a and 208a) behind the cargo "W" push toward the other shelf 202 that is level with the platform 203. After completion of the transfer of the cargo "W" onto the shelf 202, the traversers return to their home position P1, without any change in the positions of any transfer arms.

Figure 25:
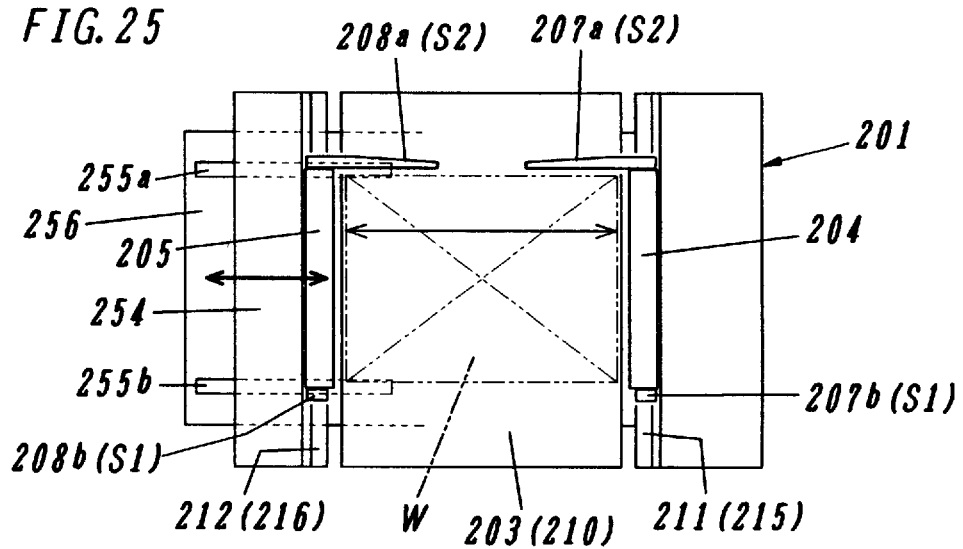
FIG. 25 is a plan view of a modification of the third embodiment.

FIG. 25 illustrates a modification of this third embodiment of the present invention, wherein one of the traversers 205 located along one side of the platform 203 is mounted on a sliding plate 254. This plate can be displaced toward or away from the other traverser 204 so that the distance between the traverser 204 and 205 is adjustable within a certain range. In this case, the fixed rail 216 supporting the traverser 205 through the intermediate rail 212 is mounted on the sliding plate 254. The slide plate carrying the traverser 205 and is placed perpendicularly to the transfer path must not hinder the traverser and the transfer arms 208a and 208b carried thereby from smoothly moving along the transfer path. This requirement can be met by the provision in the first driving means 206 of substituting a telescopic transmission shaft 222 for the rigid shaft 222 in the first driver 213. Alternatively, an end of the rigid transmission shaft 222 can be splinted to be in an axially sliding engagement with the set of bevel gears 221b rotatably supported by the sliding plate. A further arrangement meeting the above requirement can be the provision of a telescopic transmission shaft 239 in the second driving means 209, which takes the place of the rigid shaft 239. Alternatively, an end of the rigid transmission shaft 239 can be splinted to be in an axially sliding engagement with the pinion 240 rotatably supported by the sliding plate. Guide rails 255a and 255b support the sliding plate 254 to be displaced perpendicular to the transfer path. Those guide rails are mounted on a fixed plate 256 to which the other traverser 204 is secured.

The position of sliding plate 254 can manually adjusted and subsequently fixed again to match the width of the cargo "W". A motor driven and threaded rod can be relied upon instead to carry out the adjustment automatically. This modification can also be applied to the other traverser 204, or to both traversers 204 and 205 so that they are displaced towards or away from each other in opposite directions perpendicularly to the transfer path. In the latter case, the center line of the transfer path remains invariable, only with its width is altered.

In the third embodiment described above, in the second drive 209 one set of transfer arms 207a and 208a in each pair swings in the direction opposite to that in which the other arms 207b and 208b are swung. However, both the arms 207a and 207b (as well as the arms 208a and 208b) in each pair can be swung always in the same direction. For example, one of the bevel gears 236b and one of the split shafts 235b the internal transmission 231 can be dispensed with. In this case, one of the split shafts 235a extends to take the place of the other shaft 235b so that the transfer arms 207a and 207b (or 208a and 208b) in each pair can be attached thereto.

Figure 26:
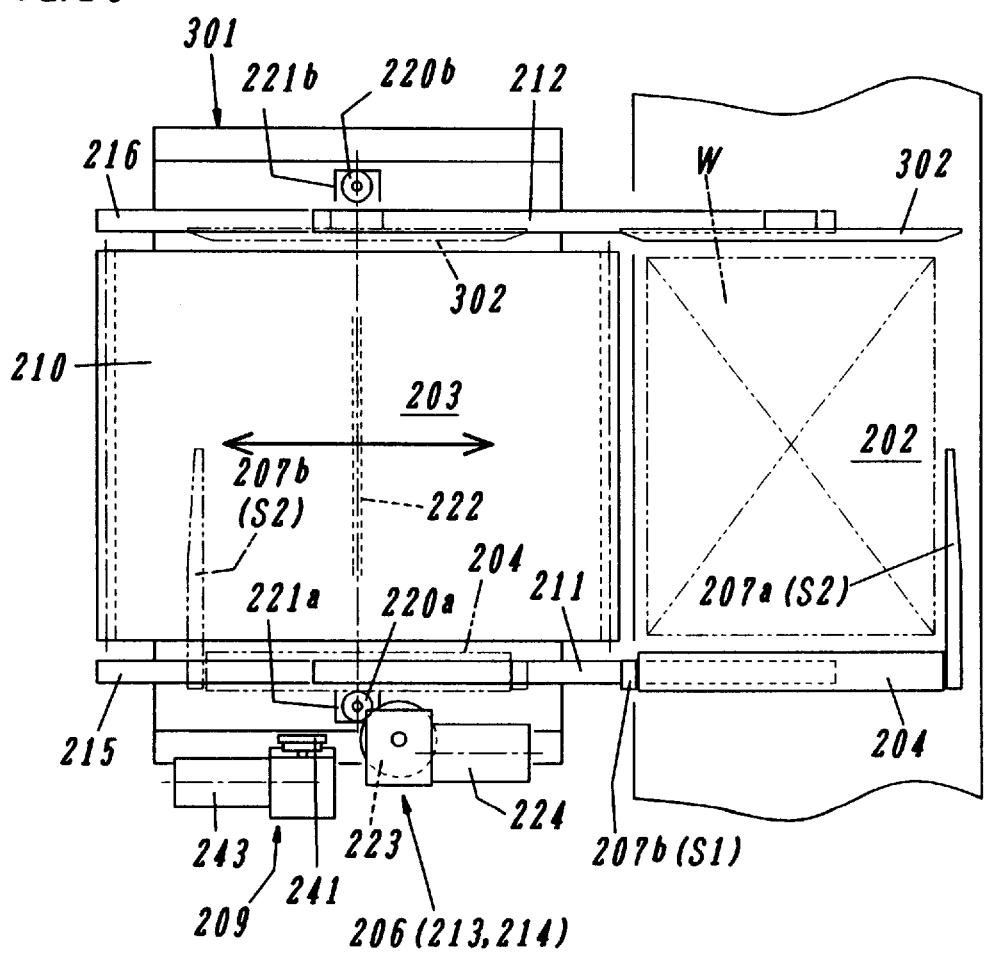
FIG. 26 is a plan view of a fourth embodiment of a cargo transfer apparatus wherein the shelf in the shelving rack is shown being loaded or unloaded by the apparatus.
Figure 27:
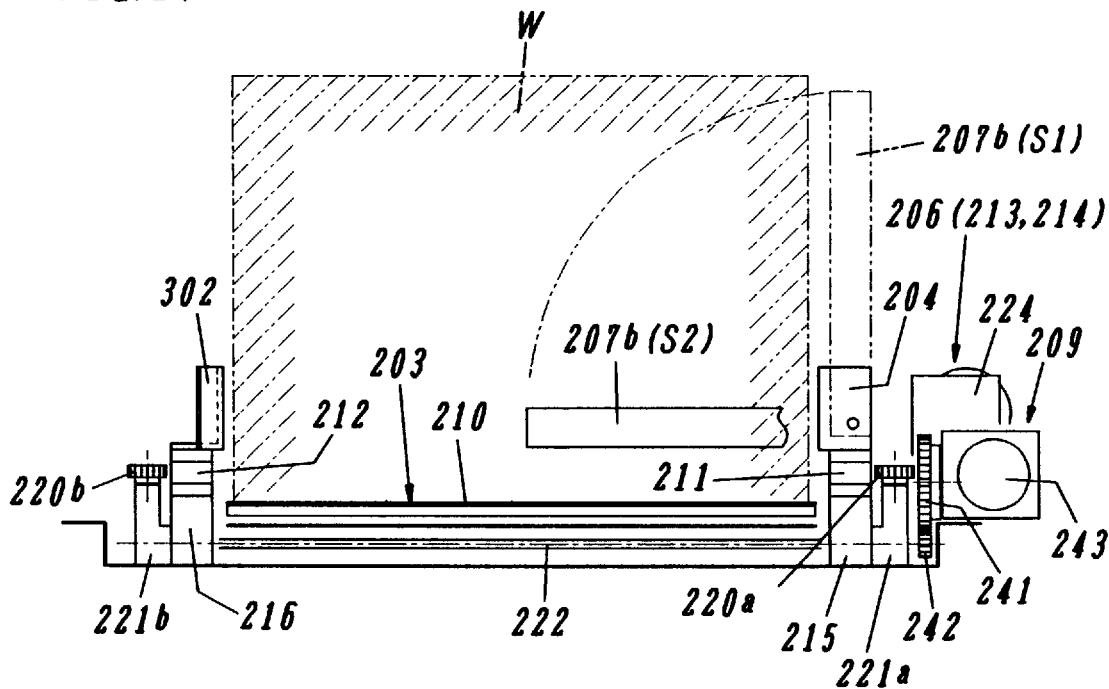
FIG. 27 is a rear elevational view of transfer arms in their lowered position in the apparatus, with a portion thereof being cut off.
Figure 28:
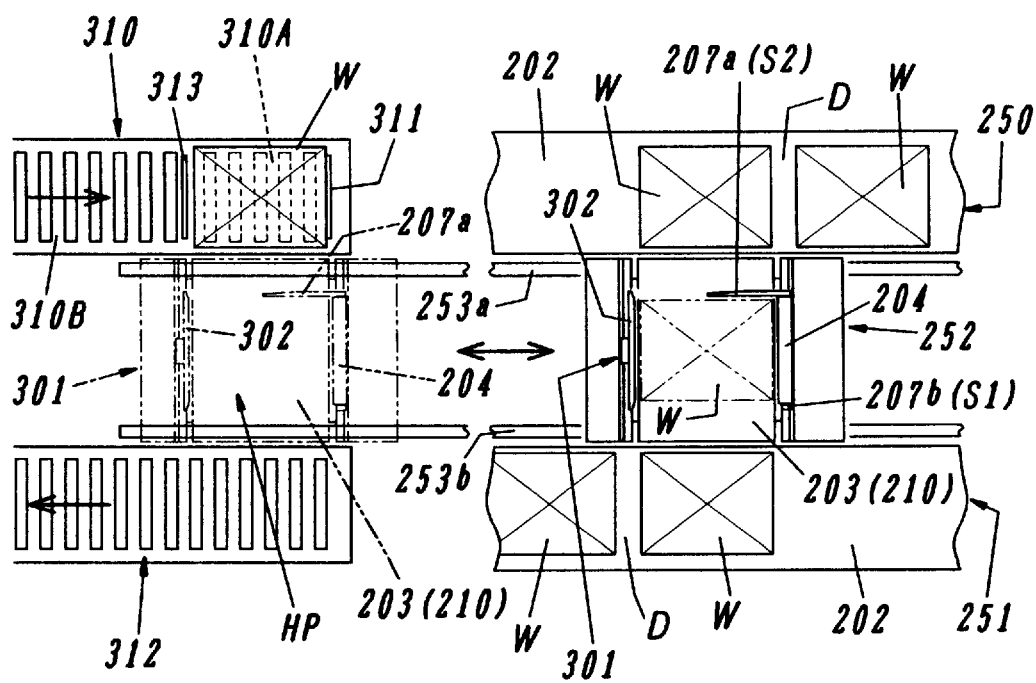
FIG. 28 is a schematic plan view of the apparatus in combination with the transporter in an automated warehouse.

A fourth embodiment of the transfer apparatus 301 of the present invention is shown in FIGS. 26 to 28. This fourth embodiment differs from the third embodiment for cargo transfer, as described below. Only one of the traversers 204 in the third embodiment has a pair of the transfer arms 207a and 207b, the other traverser 205 is replaced with a side guide 302 that is specific to the fourth embodiment of the invention. A first drive 206 employed herein is the same as that employed in the third embodiment. A second drive 209 operates only the transfer arms 207a and 207b to be raised and lowered on the traverser 204. The side guide 302 does not require any mechanism for swinging any further arms 208a and 208b on the other traverser 205 as employed in the third embodiment shown in FIGS. 18 to 22. Thus, no common transmission shaft 239 of the third embodiment is required in the fourth embodiment of the present invention. The reference numerals in FIGS. 26 to 28 are the same of the parts which are the same as or are similar to those in the third embodiment, and their description thereof is abbreviated here.

Similarly to the apparatus of the third embodiment, the transfer apparatus 301 this third embodiment can be mounted on the transporter 252 shown in FIG. 28. This transporter suitably is also an electric car which is movable on a passageway defined between the racks 250, 251 each containing cargo storage shelves 202 (see FIG. 26.). The traversers 204 and the side guide 302 of the transfer apparatus 301 reciprocate along a horizontal transfer path perpendicularly to the passageway between the racks 250, 251.

The operation and functioning of the transfer apparatus 301 is essentially the same as that of the third embodiment of the present invention, whether the cargo 'W' is transferred from the shelf 202 of the rack 250, 251 onto the cargo platform 203 of the transporter 252 of the transfer apparatus 301, or reversely from the cargo platform 203 into a shelf 202. However, the cargo 'W' being transferred in this fourth embodiment of the present invention is sandwiched between the traverser 204 and the side guide 302, when pushed by the transfer arms 207a, 207b pivoted from the traverser.

A storing conveyor 310 shown in FIG. 28 can be used to store the cargo 'W' in the automated warehouse wherein the racks 250 and 251 and the transporter 252 are installed. The cargo 'W' is transported by the conveyor parallel to the reciprocal direction of the transporter 252. The side guide 302 is located upstream of the transfer apparatus 301, with the traverser 204 located downstream with respect to the direction of the cargo advancing on the storing conveyor 310 entering the warehouse. A terminal stopper 311 is suitably attached to a downstream end of the path of the conveyor 310, with the transporter 252 temporarily standing still at its home position 'HP'. Thus, the leading edge of the cargo 'W' stopped beside the transporter 252 and resting at the home position 'HP', is flush with the inner surface of traverser 204. The transfer apparatus 301 is adapted smoothly to move the cargo 'W' on the storing conveyor 310 onto the cargo platform 203 of the transporter 252, as described above.

The transfer arm 207a can load any cargo 'W' onto the cargo platform 203 unless the cargo is wider than the distance between the side guide 302 and the traverser 204.

A discharging conveyor 312 transports the discharged cargo. The storing conveyor 310 is suitably divided into a downstream section 310A and an upstream section 310B. The downstream section 310A, is a delivery zone where the terminal stopper 311 stops the cargo 'W' for delivery to the transporter. An additional stopper 313 can be driven up and down interposed between the upstream and downstream sections 310A, 310B. The cargo can be transferred from the upstream section 310B to the downstream section 310A while the additional stopper 313 is retracted. After the leading cargo 'W' passed the additional stopper 313, it is then stopped by the terminal stopper 311 to stand still on the downstream section 310A, the additional stopper 313 is raised so that the next cargo and succeeding cargo remain on the upstream section 310B. The terminal stopper may or may not interfere with the traverser 204. If they interfere with each other, this stopper 311 is designed to be extendible and retractable. With the stopper 311 retracted, the downstream section 310A of the conveyor 310 is switched off to stand still during the transfer of cargo 'W' onto the transporter 252 by means of the transferring apparatus 301.

The downstream section 310A suitably considers driven rollers and free rollers ranged perpendicularly thereto, with the driven rollers being at the same height as the upstream section 310B. The free rollers can be lifted above the driven rollers and into flush with the cargo platform 203 of the transporter 252, upon contact of the cargo with the stopper 311. The free rollers are then lowered to facilitate the transfer of cargo to the transporter. Alternatively, the driven rollers can be lowered so that the free rollers as the platform 203 at the same level support the cargo to be transferred to the cargo platform.

Figure 29:
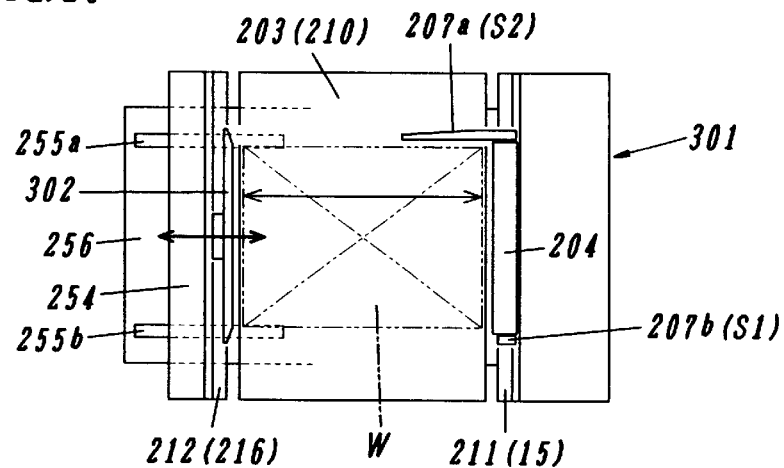
FIG. 29 is a plan view of a modification of the fourth embodiment of the present invention.

A modification similar to that discussed in the third embodiment and shown in FIG. 25 is also possible in this fourth embodiment so that the distance between the side guide 302 permits adjustment of the traverser 204 carrying the arms 207a and 207b. For example, the side guide 302 along a side of the platform 203 can be mounted on sliding plate 254 in the manner shown in FIG. 29. This plate 254 is displaceable toward or away from the traverser 204 so that the distance between them is adjustable within a certain range. The same reference numerals are given to components that are the same as or similar to those in FIG. 25. The slide plate 254 can be incorporated to mount the traverser 204 thereon for being shifted toward or away from the side guide 302. Alternatively, both the traversers 204 and the side guide 205 can be mounted on respective slide plates so that they are simultaneously displaced toward or away from each other opposite directions.

Figure 30:
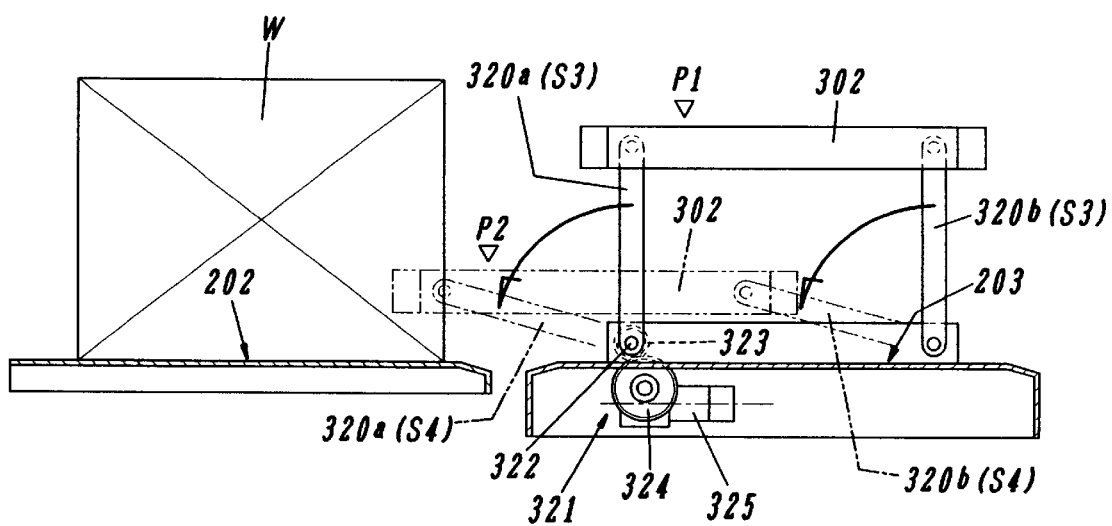
FIG. 30 is a plan view of yet another modification of the fourth embodiment.

FIG. 30 shows an alternative example of the drive for the side guide 302. Here parallel links 320a and 320b are adapted to rock in the direction that cargo is transferred onto and out of the platform. The links 320a and 320b are connected to a forward and rearward ends of the side guide. A driver 321 having a suitable shaft 322 drives the links to their upright position S3 and their lowered position S4. A base portion of one of the links 320a is attached to the shaft 322 close to the bed 203. A gear 323 is attached fixed to the shaft 322 meshing with an intermediate gear 324 which is driven by an electric motor 325 having an integral reduction box. The gear 323 is also driven by the motor 224 shown in FIG. 26 provided in the first drive 206 for the traversers 204.

The drive 321 operates when the motor 325 is switched on, the gear 323 rotates to shift the link 320a upright to its position S3 and to its lowered position S4 indicated by broken lines. The side guide 302 is thus moved from its retracted position P1 above the platform 203 to its extended position P2 in the shelf 202. A reverse motion of the link 320a from its lowered position S4 to its upright position S3 raises the side guide 302 to its retracted position P1 from its extended position P2.

The extended position P2 does not necessarily mean a position of the side guide 302 that is completely accommodated within the shelf. The side guide merely functions to prevent the cargo 'W' from moving obliquely, at an undesired angle when pushed by the transfer arm 207a or 207b. Therefore, only an end portion of the side guide 302 is placed into the shelf 202 and positioned closely to a side of the cargo therein, in a manner shown by the broken lines in FIG. 29. Even such a partial engagement will be sufficient for the side guide to ensure a normal position of the cargo which is being transferred onto the platform or into the shelf 203.

The side guide 302 can make the described translational motion either asynchronously or synchronously with the reciprocal motion of the traverser 204 carrying the arms 207a and 207b. When the side guide 302 leaving the bed 203 enters the shelf 202 in its entirety to take its extended position P2, it is preferable for the side guide to move together with the traverser 204. When only the end portion of the side guide faces the side of the cargo at the extended position P2 shown in FIG. 29, the rearward retraction of the side guide 302 out from the shelf 202 can suitably be effected after the retraction of traverser 204 has finished, though the side guide is driven forward simultaneously with the traverser.

The transfer apparatus of the present invention can be suitably mounted on a liftable carriage employed in the so-called 'stacker-crane type', where the carriage is lifted and lowered to serve selected, vertically arranged shelves. The transfer apparatus of the present invention can also be employed in a horizontally stationary elevator which only ascends and descends for transporting cargo, or in stationary apparatus which moves neither horizontally nor vertically.

The embodiments described hereinabove can be combined with each other. For example, each period the transfer arms 10a and 10b, or 111a and 111b, or 112a and 112b in the first or the second embodiment can be driven in opposite directions, similarly to those 207a and 207b or 208a and 208b in the third embodiment, or to those 207a or 207b in the fourth embodiment. In contrast, each pair of the transfer arms 207a and 207b or 208a and 208b, or those 207a and 207b in the pair employed in the third or fourth embodiments can always be driven in the same direction, as is the case for the transfer arms 10a and 10b, or 111a and 111b, or 112a and 112b in each pair of the first or second embodiments.

Furthermore, each of the transfer arms 111a–112b and 207a–208b in the second, third and fourth embodiment can have their free ends lowered below their base positions when laid to their active position, similarly to those in the first embodiment shown in FIG. 8. The first drive for the traverse 9, 109, 110, 204, 205 and/or the side guide 302 are not necessarily restricted to those described in the various embodiments. The second drive for the transfer arms can be a motor, a rotary solenoid, an electric actuator of the cylinder type, or a pneumatic or hydraulic cylinder, each installed in the traverser to which the arms are pivoted.

We claim:

1. A cargo transfer apparatus, comprising
   (i) a cargo platform for supporting cargo having respective front and rear faces, the cargo being transferred from said platform and thereto along a horizontal transfer path between the platform and a shelf, the transfer path defining a transferring direction of the cargo and having a left and a right side, and said platform having a front end and a rear end,
   (ii) a traverser having a forward and rearward end, the traverser being disposed along at least one said side of the transfer path and having a retracted position along said cargo platform and being extendable from its retracted position to and into the shelf, (iii) a first drive for reciprocating said traverser along the transfer path, (iv) a pair of transfer arms for pushing one of two opposing front and rear faces of the cargo relative to said transferring direction, toward and away from said cargo platform, each transfer arm being attached respectively to the forward and rearward ends of said traverser, said arms being spaced from each other by a distance greater than the length between the two opposing front and rear faces of the cargo relative to said transferring direction, each of said transfer arms having a free end, an upright resting position, and a lowered active position where the free end projects over the transfer path, and (v) a second drive for moving said transfer arms between their resting positions and their active positions.

2. The cargo transfer apparatus of claim 1, wherein said second drive is adapted to swing both of said transfer arms in the same direction to move together with each other.

3. The cargo transfer apparatus of claim 1, wherein said second drive is adapted to swing both of said transfer arms in opposite directions to move together in an opposite sense with each other.

4. The cargo transfer apparatus of claim 1, wherein said second drive is adapted to swing each of said transfer arms at an angle greater than 90°, and in the lowered active position the free end of each transfer arm is lowered below a base position.

5. The cargo transfer apparatus of claim 1, wherein said second drive has a spring urging each transfer arm toward its upright resting position, the movement of the transfer arms to their lowered active positions taking place against the bias of said spring.

6. The cargo transfer apparatus of claim 1, wherein said traverser comprising a pair of traversers each being disposed along both the left and the right sides of the transfer path, said first drive being adapted to move said traversers together and in the same direction, some of said transfer arms being attached to respective forward ends of said traversers and are moved together in one direction by said second drive, and others of said transfer arms being attached to respective rear ends of said traversers and are moved together in the other direction by said second drive.

7. The cargo transfer apparatus of claim 6, wherein said second drive has a rotatable shaft in each of said traversers, a wire rope having an end attached to said rotatable shaft and an intermediate portion at each of said traversers, a guide ring engaging with the intermediate portion, and a motor for displacing the guide ring relative to a guide ring on another traverser parallel to the transfer path, whereby when at least one wire rope is pulled it swings both transfer arms of each traverser in the same direction toward their upright resting position or their lowered active position.

8. The cargo transfer apparatus of claim 6, further comprising means for adjusting the distance between the traversers.

9. The cargo transfer apparatus of claim 1, further comprising a lateral guide having a forward end and a rearward end, a third drive for reciprocating said lateral guide along the transfer path between a retracted position adjacent to the cargo platform and an extended position to and into a shelf, and said lateral guide is disposed on the other side from said traverser.

10. The cargo transfer apparatus of claim 9, further comprising means for adjusting the distance between said lateral guide and the traverser.

11. The cargo transfer apparatus of claim 9, wherein said third drive has at least two parallel links connected respectively to the forward and rearward ends of said lateral guide, and a driver for rocking the links between said upright and lowered positions of said transfer arms.

12. The cargo transfer apparatus of claim 1, said second drive comprising a drive rotor attached from said cargo platform, a rope end retainer attached from a rotatable shaft, and at least one wire rope extending between said drive rotor and said rope end retainer and being adapted to be pulled by said drive rotor, the rotatable shaft being rotated forward and reverse at an angle by said second drive, said transfer arms being attached from said rotatable shaft.

13. The cargo transfer apparatus of claim 12, further comprising a spring for urging said rotatable shaft into an angular position and the transfer arms into their upright resting position, said drive rotor being adapted to pull said wire rope to swing said transfer arms from their upright resting position to their lowered active position.

14. The cargo transfer apparatus of claim 12, wherein said at least one wire rope comprises a first wire rope and a second wire rope, the first wire rope being adapted to lower the transfer arms when said drive rotor is rotated in one angular direction, and the second rope being adapted to raise the transfer arms when said drive is rotated in the other angular direction.

15. The cargo transfer apparatus of claim 1, wherein said first drive comprises an intermediate rail having two ends and being supported from said cargo platform for supporting said traverser and for movement along the transfer path, a first driver for moving the intermediate rail forward and backward, a second driver for moving said traverser in the same direction and together with said intermediate rail and having a driven member supported from said cargo platform for movement along the transfer path, a forward and backward pivotable and rockable lever for the traverser, an internal transmission for changing the rocking motion of said lever into a swinging motion of said transfer arms, a transmission cable disposed between the ends of the intermediate rail and connected from the driven member and the lever, and means for moving the driven member forward and backward.

16. The cargo transfer apparatus of claim 1, further comprising a transporter movable perpendicularly to the transfer path along one or more shelving racks containing shelves, said cargo platform, traverser, first drive, transfer arms and second drive all being attached from the transporter, said traverser and said transfer arms being adapted to move through a space between adjacent shelves in a shelving rack.

* * * * *